(12) United States Patent
Hellenes

(10) Patent No.: US 12,296,280 B2
(45) Date of Patent: May 13, 2025

(54) METHOD FOR CONTINUOUS THERMAL SEPARATION OF A MULTI-COMPONENT SUBSTANCE

(71) Applicant: Hellenes Holding AS, Førde (NO)

(72) Inventor: Agnar Hellenes, Førde (NO)

(73) Assignee: Grant Prideco, Inc., Houston, TX (US)

( * ) Notice: Subject to any disclaimer, the term of this patent is extended or adjusted under 35 U.S.C. 154(b) by 158 days.

(21) Appl. No.: 17/783,101

(22) PCT Filed: Dec. 9, 2020

(86) PCT No.: PCT/EP2020/085337
§ 371 (c)(1),
(2) Date: Jun. 7, 2022

(87) PCT Pub. No.: WO2021/116201
PCT Pub. Date: Jun. 17, 2021

(65) Prior Publication Data
US 2023/0011152 A1   Jan. 12, 2023

(30) Foreign Application Priority Data

Dec. 9, 2019 (EP) .................................... 19214531

(51) Int. Cl.
*B01D 1/22* (2006.01)
*B01D 1/00* (2006.01)
(Continued)

(52) U.S. Cl.
CPC ........... *B01D 1/223* (2013.01); *B01D 1/0082* (2013.01); *B01F 27/73* (2022.01);
(Continued)

(58) Field of Classification Search
CPC ......... B01D 1/0082; B01D 1/223; B01D 3/08
See application file for complete search history.

(56) References Cited

U.S. PATENT DOCUMENTS

| 3,300,868 A | 1/1967 | Anderwert |
| 3,808,701 A | 5/1974 | Bachmann |

(Continued)

FOREIGN PATENT DOCUMENTS

| CN | 104602777 A | 5/2015 |
| CN | 106457059 A | 2/2017 |

(Continued)

OTHER PUBLICATIONS

International Search Report issued in PCT/EP2020/085337 on Feb. 2, 2021 (4 pages).
(Continued)

*Primary Examiner* — Jonathan Miller
(74) *Attorney, Agent, or Firm* — Osha Bergman Watanabe & Burton LLP

(57) ABSTRACT

A method for thermal separation of a substance flowing into a treatment chamber by use of a separation apparatus includes a vessel and a heating device. The vessel has a vessel wall with an inner surface enclosing a treatment chamber of a length $l_c$, a height H and a width W. The vessel includes at least one substance inlet and at least one first outlet and at least one second outlet for non-evaporable and evaporable parts, respectively. The heating device is arranged outside the treatment chamber and a rotary mechanism includes a rotatable axle arranged within the treatment chamber directed along the treatment chamber's length h and a mixing device of radial diameter $d_{md}$ and axial length $I_{md}$ fixed to the rotatable axle and extending perpendicular to the rotatable axle. The method includes: A. heating the inner surface (la) by use of the heating device to transfer thermal energy to a minimum peripheral volume ($V_p$) of the treatment chamber confined between the mixing device and the inner surface (la), B. rotating the rotary mechanism by use of a rotary drive operably fixed to the rotatable axle to a
(Continued)

peripheral rotation velocity ($v_p$) measured at a radial outer boundary of the mixing device's which exceeds a minimum peripheral rotation velocity ($v_{p,mm}$) of 5 meters per second, C. feeding the substance into the treatment chamber through the at least one substance inlet using a feeding device, wherein the substance includes two or more components, where at least one of the components is evaporable at an evaporation temperature ($T_e$), and D. adjusting at least one of an input power of the heating device, the flow of the substance fed into at least one of the at least one substance inlet, an input power of the rotary drive and an output flow of a non-evaporated part of the substance released from the at least one first outlet, such that a total thermal energy transferred into at least part of the minimum peripheral volume ($V_p$) results in an operational temperature ($T_{op}$) that exceeds the evaporation temperature ($T_e$) during operation, and wherein the amount of thermal energy transferred into the part of the minimum peripheral volume ($V_p$) by the heating device constitutes more than 60% of the total thermal energy transferred.

19 Claims, 10 Drawing Sheets

(51) Int. Cl.
  *B01F 27/73* (2022.01)
  *B01F 35/21* (2022.01)
  *B01F 35/221* (2022.01)
  *B01F 35/92* (2022.01)
  *B01F 35/90* (2022.01)

(52) U.S. Cl.
  CPC ...... *B01F 35/2115* (2022.01); *B01F 35/2211* (2022.01); *B01F 35/92* (2022.01); *B01F 2035/99* (2022.01)

(56) References Cited

U.S. PATENT DOCUMENTS

| | | | | |
|---|---|---|---|---|
| 4,222,988 | A | * | 9/1980 | Barthel ............... F26B 5/04 |
| | | | | 202/136 |
| 4,287,026 | A | * | 9/1981 | Wallace ............... C02F 1/06 |
| | | | | 203/99 |
| 4,869,810 | A | | 9/1989 | Ellingsen et al. |
| 5,375,343 | A | | 12/1994 | Egger |
| 6,165,349 | A | | 12/2000 | Madar |
| 6,485,631 | B1 | * | 11/2002 | Ellingsen ............ C10G 47/24 |
| | | | | 208/143 |
| 7,396,433 | B2 | * | 7/2008 | Strand ................ B09B 3/45 |
| | | | | 34/498 |
| 9,102,545 | B2 | * | 8/2015 | Riley ................. F22B 3/06 |
| 10,173,146 | B2 | * | 1/2019 | Bikass ............... B09B 3/45 |
| 10,273,168 | B2 | * | 4/2019 | Riley ................ B01D 1/228 |
| 2004/0172996 | A1 | | 9/2004 | Matsui |
| 2009/0060826 | A1 | | 3/2009 | Ohashi et al. |
| 2011/0094940 | A1 | * | 4/2011 | Weisselberg .......... C10G 1/00 |
| | | | | 208/390 |

FOREIGN PATENT DOCUMENTS

| | | | |
|---|---|---|---|
| CN | 109748339 | A | 5/2019 |
| EP | 1236015 | A1 | 9/2002 |
| EP | 1535888 | A1 | 6/2005 |
| GB | 1575576 | A | 9/1980 |
| JP | S6039400 | U | 3/1985 |
| JP | 2003519768 | A | 6/2003 |
| JP | 2004091280 | A | 3/2004 |
| WO | 2001025709 | A1 | 4/2001 |
| WO | 2002/092187 | A1 | 11/2002 |

OTHER PUBLICATIONS

Written Opinion of the International Searching Authority issued in PCT/EP2020/085337 on Feb. 2, 2021 (10 pages).
International Preliminary Report on Patentability from PCT/EP2020/085337 mailed on Feb. 7, 2022 (28 pages).
Extended European Search Report issued in counterpart European Patent Application No. 19214531.6, mailed on Feb. 20, 2020 (8 pages).
English Translation of Office Action issued in Chinese Application No. 2020800849695; Dated Dec. 26, 2023 (7 pages).
Office Action issued in Japanese Application No. 2022-534658, mailed Jun. 26, 2024 (9 pages).
"Building Construction Machinery", edited by the Cadre College of the Department of Construction, Huazhong University of Science and Technology Press, dated Sep. 30, 2009, p. 162 (4 pages).
Office Action issued in Chinese Application No. 2020800850442, mailed Jul. 7, 2024 (18 pages).

* cited by examiner

METHOD FOR CONTINUOUS THERMAL SEPARATION OF A MULTI-COMPONENT SUBSTANCE

TECHNICAL FIELD

The present invention relates primarily to a method for continuous thermal separation of a multi-component substance flowing into a treatment chamber.

The present invention is in particular related to a method that enables the utilization of waste heat as a main indirect energy contributor for the thermal separation of waste and bi-products. The separation involves removing fluids from the substance by heating.

BACKGROUND AND PRIOR ART

Various substances containing both solid material and evaporable liquids can be separated thermally by heating the substances to temperatures higher than the evaporation temperatures of the liquids.

As a result of the heating, the liquids change phase from liquid phase to gas phase, while the solids are dried. Apparatus for such thermal separation processes are well known in the art and are commonly referred to as "Thermal Desorption Units" (TDU) or driers. During the thermal treatment, the liquids are normally condensed back to liquid phase as a later or additional treatment step.

TDUs are used to treat a large number of different substances such as waste and bi-products from food production, municipal sludge, waste from refining processes or drilling and various other substances containing one or more evaporable liquids.

The prevailing thermal separation techniques commercially available on the market today may be roughly divided into two categories:
  Indirect heating thermal separation
  Friction based thermal separation Most existing TDU technologies are based on indirect heating. An external heat source is heating the outer walls of the container and the heat is transferred via the container's inner surface on to the substance to be heated.

The external heat source can in principle be anything that is capable of heating the substance to a temperature required to evaporate relevant liquids in the substance inside the container. The most used heating sources are steam, hot oil, flames, heated gas or exhaust and electricity (cables, elements, induction etc.).

An example of an apparatus for drying substances using the indirect method is disclosed in patent publication GB1575576A. The publication is in particular related to the treatment of a mixture of well drill cuttings and drilling fluids to remove volatile materials from the drill cuttings, and comprises a heater for heating the cuttings in a heating chamber to vaporize the volatile materials therein. The heating of the cuttings may involve external electrical resistance elements or by means of a thermal-transfer fluid, which in turn is heated by an electrically energized auxiliary heat exchanger.

Other relevant publications disclosing relevant prior art indirect solutions for separating waste are U.S. Pat. No. 5,375,343 A which discloses an evaporator for drying sludges and U.S. Pat. No. 3,808,701 A which discloses an apparatus for drying fluent materials.

The evaporator in U.S. Pat. No. 5,375,343 includes a hollow cylindrical and externally driven rotor equipped with vanes that extend essentially over the length of the evaporator. The apparatus assumes a gradual heating along the evaporator. Further, the apparatus of U.S. Pat. No. 3,808,701 comprises a horizontally arranged cylindrical conduit and a rotor rotating internally within the conduit. The rotor supports vane-like elements operatively associated with the inner wall of the conduit, which serve to wipe, circulate, comminute and scrape fluent material.

All existing indirect (continuous) methods will have an internal transport mechanism, where the mass will gradually be heated as time (and distance) goes by. The temperature will raise to approximately 100 degrees Celsius, but then it will take a while (and a distance) as all the energy required for the evaporation of the water is transferred to the waste. If the substance also contains liquids with a higher evaporation temperature, such as oil, most of such liquid will not evaporate before a subsequent further heating of the substance. In such situations, the internal transport mechanism is often 10 to 20 meters long, and it may take up to 20 minutes before all the liquids in the waste are evaporated.

The main challenge in existing indirect methods is the heat transfer from the inner surface of the container and into the substance to be heated. From the start, this substance or substances is/are a "wetted solid(s)". Water and possibly other liquids such as oil are integrated parts and are not "free". This substance will be influenced by gravity and will be located at or near a lower area (i.e. bottom) of the vessel/container. As the solids are heated the solids will be dried, and as a consequence the heat transfer rate will soon be reduced. Although the heat transfer rate from steel to a liquid containing substance will initially be higher, the heat transfer will gradually reach a level that is equal or similar to the heat transfer between the inner walls of the container and the dried solids in the substance. It is commonly viewed as difficult to achieve a better average heat transfer in indirect solutions than approx. 75 $W/m^2K$ for typical drilling waste compositions, i.e. oil, water and mineral solids. One challenge is related to the fact that solids will build up an isolating layer on the heated surfaces, and thereby reducing the heat transfer efficiency. For protein containing solids, this is a particular challenge, since such solids have properties that are highly influenced by heat, leading to unwanted degrading of potentially valuable solids.

Friction based thermal separation on the other hand is based on a very different principle than indirect thermal separation, namely transferring kinetic energy derived from a rotating drive into thermal energy (heat) by friction. In these friction-based processes no inner surfaces of the substance containing chamber are heated from the outside. Instead, and in clear contrast to indirect solutions, the entire heat transfer surface, i.e. the consolidated surface of all dried particles in the waste, lays entirely within a process chamber. This consolidated surface area is very large compared to the corresponding heat transfer surfaces of indirect solutions, thereby making an internal transport mechanism irrelevant.

The friction-based solutions are completely dependent on rotational energy and are therefore not utilizing surplus heat sources or other external indirect heat sources.

Also, the energy losses in a friction-based solution are normally significant. A loss of approximately ⅔ is typical where for example a diesel engine is used to create necessary rotational energy and/or electric power originating from a diesel generator.

The following patent publications disclose relevant examples of known friction-based dryers.

U.S. Pat. No. 4,869,810 (A) discloses a method of separating oil in water and other evaporable liquids from drilling mud, bleaching earth, sludge from oil tanks, oil shale or the like, the mud being evaporated at a lower temperature than with conventional evaporation due to the fact that the capillary forces binding the separate fractions in the pores of the mud are destroyed in a friction evaporator.

WO02092187 (A1) discloses a method for separating oil, water and other components that can be evaporated from an oil-containing material by evaporation. The evaporation is achieved at a lower temperature than the atmospheric boiling point of the component, due to the utilization of the gas phase established by evaporation of a second component. Means for drying of fluid-containing material comprising a processing chamber and a rotor mounted in said processing chamber is also included. The rotor comprises a number of fixed rotor arms that cannot swing and the inner surface of the processing chamber is smooth.

The operation of all known friction-based dryers relies on extensive use of rotational energy. Hence, use of alternative energy sources such as surplus energy is limited.

A common disadvantage for any of the known thermal techniques (both indirect methods and friction-based methods) is the consumption of large amounts of energy, both causing high operation costs and/or high investment costs.

For that reason, cheaper, less efficient solutions are often chosen such as landfill or incineration. These cheaper solutions are often problematic due to their environmental hazard and waste of potentially valuable resources.

In view of the above, it is an object of the invention to provide a method that solve or at least mitigate one or more of the aforementioned problems related to use of prior art solutions.

A particular object of the invention is to provide a method than can use a more compact apparatus.

Another object of the invention is to provide a method that provides a more efficient separation of a multi-component substance fed into the apparatus.

Yet another object of the invention is to provide a method that provides a more effective mixing of a multi-component substance fed into the apparatus.

Yet another object of the invention is to provide a method that causes a more favorable energy consumption during drying by utilizing of waste heat source. Exploiting unused (spilled) waste heat/surplus heat may reduce the operational cost significantly.

In addition, or alternatively, the invention has the objective of providing a method that enables effective utilization of other surplus energy sources including components separated in the process with a calorific value, such as oil or dried biomass. Examples of such wastes are waste oil, waste solvents, refuse derived fuel, carpet and textile waste, plastic or mixed plastic waste, automotive shredder residue and meat/bone meal (MBM).

The surplus heat and/or the calorific components from the waste may be used for thermal separation at site, for example on an oil drilling platform.

Further, surplus heat and/or calorific components from the waste can substitute other energy contributors partly or fully.

Some existing solutions are capable of utilizing surplus heat as the main energy supply for the thermal separation. However, these solutions have a limited heat transfer capacity and will necessarily need large heated surfaces and long internal transport mechanisms. Consequently, they will be large with higher energy loss, and the comparably larger heated surfaces need to be protected/insulated, both to avoid heat losses and to reduce hazards.

SUMMARY OF THE INVENTION

The present invention is set forth and characterized in the independent claims, while the dependent claims describe other characteristics of the invention.

In one aspect, the invention is related to a method for thermal, preferably continuous, separation of a substance flowing into a treatment chamber by use of a separation apparatus.

The separation apparatus comprises a vessel having vessel wall with an inner surface enclosing a treatment chamber of a length $l_c$, a height H and a width W, wherein the vessel comprises at least one substance inlet, at least one first outlet for non-evaporable components and at least one second outlet for evaporable components, respectively, a heating device arranged outside the treatment chamber, for example at an outer surface and/or within the vessel wall, and a rotary mechanism comprising a rotatable axle arranged within the treatment chamber directed along the treatment chamber's length $l_c$ (hereinafter referred to as the L-direction). The rotary mechanism further comprises a mixing device of radial diameter $d_{md}$ and axial length $l_{md}$ fixed to the rotatable axle so that it extends a significant distance perpendicular to the L-direction, preferably at least 80% of the linear distance between a central axis $C_{TC}$ of the treatment chamber and the inner wall, even more preferably at least 90%. A radial outermost part of the mixing device, for example up to 20% of the radial extend of the mixing device, or up to 10% of the radial extent, may comprise sets of radially separated mixing protrusions, where the sets are axially offset relative to each other. The mixing protrusions allow intense mixing of at least part of the substance, preferably all evaporated substance, at the inner surface.

The central axis $C_{TC}$ is defined as the axis oriented along the L-direction and positioned at the mid position of the treatment chamber's mean width W and mean height H.

In one embodiment, the mixing protrusions may be in form of rods protruding radially from an outermost boundary of the mixing device's remaining part and distributed with spacings along at least 80% of the length of the rotatable axle.

In another embodiment the protrusions extend continuously across the length of the mixing device parallel to the rotatable axle.

The method comprises the following steps (in any sequence):

A. heating the inner surface by use of the heating device to transfer thermal energy from the heating device, via the inner surface, by direct contact to a minimum peripheral volume $V_p$ of the treatment chamber confined between the mixing device (including the mixing protrusions) and the inner surface, wherein, if present, the thermal energy is transferred to a vapor cloud created there within (see step D below), B. rotating the rotary mechanism by use of a rotary drive operably fixed to the rotatable axle to a peripheral rotation velocity $v_p$ measured at a radial outer boundary of the mixing device's (that is, the radial outer boundary of the mixing protrusions) which exceeds a minimum peripheral rotation velocity $v_{p,min}$ of 5 meters per second, C. feeding the substance into the treatment chamber through the at least one substance inlet using a feeding device, preferably an automatic feeding device, wherein the substance comprises two or more components where at least one of the components is evaporable at an evaporation temperature $T_e$ (for example less than 200° C.) and D. adjusting at least one of
an input power of the heating device and
the flow of the substance into the treatment chamber, i.e. through at least one of the at least one substance inlet,
an input power of the rotary drive and
an output flow of a non-evaporated part of the substance released from the at least one first outlet,
such that a total thermal transferred energy into at least part of the minimum peripheral volume $V_p$ results in an operational temperature $T_{op}$ that exceeds the evaporation temperature $T_e$ during operation, and wherein the amount of thermal energy transferred into the part of the minimum peripheral volume $V_p$ by the heating device constitutes more than 60% of the total transferred thermal energy, preferably at least 65%, more preferably at least 70%, for example 75%.

The total transferred thermal energy combined with the intense mixing creates a vapor cloud comprising a mixture of evaporated part(s), i.e. component(s) in a fluid state (gas or liquid), and non-evaporated parts such as dry solids.

The result is in a near instantaneous heating and evaporation within the minimum peripheral volume $V_p$, i.e. on, or at the vicinity of, the inner surface.

An outermost radial part of the mixing device preferably comprises a plurality of radially separated mixing protrusions.

Further, the plurality of radially separated mixing protrusions may be divided into one or more sets distributed axially along the rotatable axle, across the axial length $l_{md}$ of the mixing device. The number of mixing protrusions in each set is defined as the number of axially nearest mixing protrusions in a complete circle around the rotatable axle when seen along the direction of the rotatable axle at an axial position directly in front of the set in question.

Moreover, the minimum peripheral rotation velocity $v_{p,min}$ of the rotary mechanism is further defined as $$v_{p,min} = C(d_{md}/\#_{mp}),$$

where
C is a constant equal to, or higher than, $12\pi$,
$\#_{mp}$ is the number of the radially separated mixing protrusions in each set and
$d_{md}$ [m] is the radial diameter of the mixing device (i.e. including the mixing protrusions).

The radially separated mixing protrusions may for example be aligned with a plurality of axial planes having mutual radial offsets, and where all of the axial planes are intersecting the central axis $C_{TC}$.

If the mixing protrusions in each set are in form of radial rods, and these rods are not axially shifted substantially relative to each other, the maximum mixing of the non-evaporated and the evaporated parts of the substance at the inner surface takes place at and near one radial plane within the treatment chamber. In such configuration, the mixing device comprises a plurality of such radial discs of mixing protrusions. If the mixing protrusions are in form of axial rods constituting the radial outermost part of the mixing device, only one single set may be present.

In a preferred configuration, the mixing protrusions of each set are set in alignment with the five radially separated axial planes, i.e. directly behind each other when seen along the central axis $C_{TC}$. In a particular configuration with a total of 100 mixing protrusions over the entire mixing device length $l_{md}$ and a number of 10 mixing protrusions in each set ($\#_{mp}$=10), there will be 9 more sets aligned in axial offset radial planes.

In another example of the invention, each or some mixing protrusion(s) within each set may be shifted axially. Hence, instead of having a maximum mixing in distinct radial planes along an axial length $l_{md}$ of the mixing device, the maximum mixing occurs in one or more sweeping areas around the circumference of the inner surface.

In one version of the latter example, the mixing protrusions are continuously shifted axially across the entire axial length $l_{md}$ of the mixing device.

In a particular embodiment the input power of the rotary drive and/or the input power of the heating device is controlled by the output flow released from the at least one first outlet.

The definition of the minimum peripheral volume $V_p$ shall be interpreted as the volume between the inner wall(s) of the vessel and outside the outer boundaries of the mixing device (in all spatial directions). Hence, empty spaces between the radially separated mixing protrusions do not form part of the minimum peripheral volume $V_p$. For example, if the vessel is a container where both its inner length $l_c$ and its inner diameter $d_c$ is 1 meter, and the mixing device fixed to the rotatable axle has an diameter $d_{md}$ which extends in average 0.95 meter radially and extends a length $l_{md}$ in average 0.90 meter axially, the minimum peripheral volume $V_p$ is:

$$V_p = V_{cylinder} - V_{mixing\ device} = (1/4)\pi(d_c^2 l_c - d_{md}^2 l_{md}) \approx 0.15 \text{ m}^3,$$

where $d_c$=1 meter, $l_c$=1 meter, $d_{md}$=0.95 meter and $l_{md}$=0.90 meter.

Hence, in this example, $V_p$ constitutes about 20% of the entire internal volume of the vessel.

By maintaining a peripheral rotation velocity $v_p$ equal or above a minimum peripheral rotation velocity $v_{p,min}$ as defined above, it is ensured that all or most of the inner surfaces are utilized during heat transfer since the effect of gravitation is avoided, or largely avoided. Furthermore, the inner surfaces are kept clean, or almost clean, thereby keeping the heat transfer higher than in existing indirect solutions.

For example, a mixing device with a diameter of 1.1 meters and sets of eight mixing protrusions arranged at its radial outermost part (where the mixing protrusions in each set are mutually aligned in common axial planes), the minimum peripheral rotation velocity $v_{p,min}$ of the mixing device using the above relation ($v_{p,min}=C(d_{md}/\#_{mp})$), becomes about 5 meters per second (m/s).

At the inner surface, the peripheral rotation velocity $v_p$ generates a centripetal force $F_c$ on the substance. The basic formula for such centripetal force $F_c$ is:

$$F_c = 2mv_p^2/d_{md},$$

where
m [kg] is affected mass at the outermost end of the mixing protrusions,
$v_p$ [m/s] is the peripheral rotation velocity and
$d_{md}$ [m] is the diameter of the mixing device.

Furthermore, the prevailing gravitational force $F_g$ at the same position is $$F_g = mg,$$

where
g [m/s$^2$] is the gravitational constant=9.8 and
m [kg] is the affected mass mentioned above.

The ratio between the centripetal force $F_c$ and the gravitational force $F_g$ is thus $$F_c/F_g = (2v_p^2)/(d_{md}g) \approx 0.2(v_p^2/d_{md})$$

Since the centripetal force Fc is proportional to the square of the peripheral rotation velocity $v_p$, a velocity of 5 m/s or higher and a mixing device diameter $d_{md}$ of around 1.1 meters, gives a ratio $F_c/F_g$ of around 5, i.e. significantly higher than 1.

Hence, to avoid undesired effect from gravitational forces during separation, the peripheral rotation velocity $v_p$ may (with such configuration) be as low as 5 m/s.

Furthermore, a mixing device with sets of eight mixing protrusions for each radial plane/sweeping area(s)$\#_{mp}$=8) and a mixing device diameter of 2 meters ($d_{md}$=2), results in a minimum peripheral rotation velocity $v_{p,min}$ of 9.4 m/s. A similar result is obtained with $\#_{mp}$=13 and $d_{md}$=3.25 m. Hence, the minimum velocity necessary to avoid significant influence of gravitation during operation may be varied by either varying the mixing device diameter ($d_{md}$) or varying the number of mixing protrusions ($\#_{mp}$) or a combination thereof.

Note that the term 'radial' signifies hereinafter the direction perpendicular to the L-direction.

In an advantageous operation, the peripheral rotation velocity $v_p$ of the rotary mechanism is regulated such that some or all of any evaporated or vaporized components/parts of the substance within the minimum peripheral volume $V_p$ (in the form of a vapor cloud) acquire a turbulent flow characteristic, that is, a movement pattern characterized by an inner state of chaotic changes in pressure and flow velocity (in contrast to laminar flow).

The presence of such turbulence flow characteristics can be detected by measuring the temperature difference $\Delta T$ between the vessel wall and the vapor cloud. When a significant drop in $\Delta T$ is measured, and/or a minimum $\Delta T$ is found, for example to about 50 K, the amount of fluid flow directed towards the inner wall has become high, indicative of a turbulence velocity pattern.

To generate a high degree of turbulence within the minimum peripheral volume $V_p$, the peripheral rotation velocity $v_p$ of the rotary mechanism may be set to a velocity exceeding a minimum peripheral rotation velocity $v_{p,min}$ of $$v_{p,min}=C(d_{md}/\#_{mp}),\text{ with } C\geq 45\pi$$

that is, at least 3.75 times the velocity criteria mentioned above for avoiding significant influence from gravitational effects during operation.

Using the same exemplary configuration as above, i.e. a mixing device with sets of eight mixing protrusions arranged at its radial outermost part and a mixing device with a diameter $d_{md}$ of 1.1 meters, the minimum peripheral rotation velocity $v_{p,min}$ of the mixing device is in this advantageous operation about 19.4 m/s.

In order to ensure an even higher degree of turbulence and heat transfer efficiency, a more advantageous operation has a minimum peripheral rotation velocity $v_{p,min}$ of $$v_{p,min}=C(d_{md}/\#_{mp}),$$

where $C\geq 60\pi$, or even better $C\geq 80\pi$

With the above exemplary configurations, $v_{p,min}$ would be about 25.9 m/s or about 34.5 m/s, respectively. The increased peripheral rotation velocity $v_p$ causing increased turbulence, results in a desired increase in the heat transfer efficiency.

Using sets of 24 mixing protrusions ($\#_{mp}=24$) and a mixing device diameter $d_{md}$ of 1.1 m, the same intense mixing (creating turbulence flow characteristics) may be obtained with velocities exceeding 11.5 m/s. However, since higher velocity contributes not only to an increase in number of sweeps across a mixing volume, but also to a more violent substance collisions ('blowing effect'), the heat transfer efficiency will be reduced compared with the same number of passes but with an higher peripheral velocity Note that these examples assume sets of mixing protrusions aligned in common axial planes along the mixing device's length $l_{md}$.

Other possible minimum peripheral rotation velocities $v_{p,min}$ for this particular configuration may be above 20 m/s, above 25 m/s or above 30 m/s. A particular example of a peripheral rotation velocity $v_p$ that ensures intense mixing to turbulent flow characteristics for this configuration may be 40 m/s.

Turbulent flow characteristic will be achieved with a lower peripheral rotation velocity if the solids in the substance has a low specific gravity (SG) (for example from biomass) compared to a substance having a higher SG (for example solids in drilling waste).

Further, if the sets of mixing protrusions deviate significantly from axial alignments (i.e. intersecting common axial planes), the relation mentioned above could be corrected by an adjustment factor $f_{mp}$:

$$v_{p,min}=f_{mp}C(d_{md}/\#_{mp}),$$

where the adjustment factor $f_{mp}$ is a phenomenological factor depending on degree of deviations from axial alignment along the length of the mixing device. Low degree of axial alignment results in a high $f_{mp}$. For example, with $C=80\pi$, $d_{md}=1.1$, $v_{p,min}=34.5$ m/s and $\#_{mp}=100$ evenly distributed both radially and axially along the mixing device's length $l_{md}$ and with a near random radial distribution, $f_{mp}=12.5$.

In an exemplary configuration of the separation apparatus, the rotatable axle of the rotary mechanism is arranged in alignment with the chamber's central axis $C_{TC}$.

In another exemplary configuration, the rotatable axle extends through the centre point of at least one terminal end wall of the vessel.

In yet another exemplary configuration, the treatment chamber has a cylindrical shape with a radial diameter $d_c$ (or mean radial diameter $d_c$ if not constant), and where the ratio between the length $l_c$ and radial diameter $d_c$ ($L/d_c$) is equal or less than 4.0, more preferably equal or less than 2.5, even more preferably equal or less than 2.0, even more preferably equal or less than 1.5, for example 1.

In addition, or alternatively, to the above exemplary configuration, the mixing device may be arranged and designed such that it does not contribute to a net transport of the substance along the L direction from the inlet to the outlets. For example, the shape of the disturbing means and/or the elongated objects may be such that no or an insignificant amount of the substance is pushed along the L direction.

In yet another exemplary configuration, the mixing device comprises a plurality of rotary discs fixed with axial offsets to the rotatable axle, with a preferred orientation radially symmetric around the rotational axis, and a plurality of elongated objects interconnecting the plurality of rotary discs. At least one of the plurality of rotary discs may display at least one through-going opening for allowing the evaporated parts of the substance to flow through during operation. At least one of these through-going openings may be designed radially symmetric around the rotational axis. Moreover, the at least one through-going opening may be arranged at the radial half of each rotary discs located closest to the rotatable axle. In this particular configuration a maximum peripheral volume may be defined as the volume between the inner wall of the vessel and the outer boundaries of the rotary discs.

In yet another exemplary configuration, the rotary disc located nearest the vessel's terminal end with the substance inlet (i.e. at the opposite end of the second outlet 5) is compact, i.e without any through-going openings, while the remaining discs displays such openings. It is thereby ensured that non-evaporated part(s) such as dry matter within the treatment chamber that are present at the inner surface due to the centrifugal force are not being guided into the mixing device, i.e. sections of the chamber where gas or gaseous components shall constitute the most dominating fraction of the substance. Hence, if the rotary disc at the terminal end is not closed, there is a possibility that the non-evaporated part(s) will be guided through the openings of the disc and into the flow of the evaporated part(s) of the substance near the rotatable axle. Such a flow of non-evaporated part(s) increases the risk of undesired release of non-evaporated part(s) from the second outlet.

In yet another exemplary configuration, the vessel may further comprise a plurality of inner ribs arranged on at least part of the inner surface, thereby increasing the surface area of the treatment chamber as well as increasing the generation of turbulence of the substance within the minimum peripheral volume $V_p$. Each of the inner ribs is protruding radially into the treatment chamber. The plurality of ribs is preferably distributed with offsets around the circumference of the inner surface, in particular on the inner wall oriented along the L direction. However, each of the plurality of ribs may also be arranged along the circumference of the inner surface perpendicular to the L direction, and distributed with offsets along the L direction.

In yet another exemplary configuration, the heating device comprises an enclosure arranged around the vessel such that a void is created between an outer surface of the vessel wall and an inner surface of the enclosure. The enclosure comprises a heat inlet for feeding heated fluid into the void for the purpose of transferring heat to the treatment chamber via the vessel wall and a heat outlet for releasing the cooled fluid out from the void. At least a part of the void may also comprise a plurality of protruding elements such as fins, thereby increasing the surface area of the outer wall, causing the heat to be transferred more efficiently into the vessel wall. The protruding elements/fins are fixed to the outer surface of the vessel wall and possibly also to the inner surface(s) of the enclosure. Further, the fins may be extending in the L direction.

The heated fluid going through the void via the heat inlet and the heat outlet may be at least one of steam, hot vapor, molten matters, heated liquid, or exhaust from an engine, turbine or incinerator.

Alternatively, or in addition, the heating device may comprise at least one heating element, for example at least one electric heating element, arranged within the vessel wall, for example in form of heating rods inserted into channels extending along the L direction. Such heating rods may be distributed with offsets around the circumference of the vessel.

Alternatively, or in addition, the heating device may comprise an electric heating system, a microwave heating system and/or an induction heating system arranged around the outer surface of the vessel.

The separation apparatus may further comprise a feeding device for feeding the flow of the substance into the treatment chamber at a flow $S_i$, a scrubber for removing fine solids from evaporated parts of the substance released from the second outlet during operation and a solid discharge system for release and collection of non-evaporated parts released from the first outlet during operation.

The flow $S_i$ may be measured as a mass flow rate in kg/hr if averaged over an appropriate period, for example 1 min or 10 min or 30 min or 1 hour or 3 hours.

With reference to step D, the input power to the heating device and/or the input power to the rotary drive may be set at constant levels, and where the flow $S_i$ is adjusted such that the operational temperature $T_{op}$ within at least part of the minimum peripheral volume $V_p$ is achieved and maintained.

Alternatively, the flow $S_i$ may be set at a constant rate, while the input power to the heating device and/or the input power to the rotary drive are/is adjusted such that the operational temperature $T_{op}$ within at least part of the minimum peripheral volume $V_p$ is achieved and maintained.

In yet another exemplary configuration, the separation apparatus further comprises a temperature sensor arranged such that a temperature within and/or at the treatment chamber may be directly or indirectly measured and a control system in signal communication with the temperature sensor, the feeding device, the heating device and/or the rotary drive. Said temperature may for example be measured somewhere at the inner surface of the treatment chamber and/or at the second outlet and/or at the first outlet and/or within the vessel wall and/or on the outer surface of the vessel wall. The measured temperature within or at the treatment chamber will herein be defined as the substance temperature.

The control system is configured to automatically adjust at least one of the flow $S_i$, the input power to the heat device and the input power to the rotary drive motor based on the temperature sensor measured substance temperature. The temperature measurements may be performed at time intervals or continuous or a combination thereof. The location of such measurements may be anywhere inside, at or adjacent the treatment chamber, for example at or near the first output and/or at or near the substance input.

For example, step D may include the following partial steps:
measuring the substance temperature by use of the temperature sensor,
transmitting the substance temperature to the control system which again calculates a new flow $S_n$ as function of the substance temperature and
adjusting the flow $S_i$ to the new flow $S_n$ by transmitting a signal to the feeding device.

These partial steps are typically performed while keeping the input power of the heating device and the input power of the rotary drive on constant, or near constant, set operational parameters.

In cases where the thermal energy is derived from a surplus source, the present invention could enable substitution or reduction of other energy inputs such as electric power, and thereby reduce the overall energy cost and/or consumption significantly and/or cause a substantial reduction in emissions of $CO_2$ equivalents.

In another aspect, the invention concerns a separation apparatus suitable for continuous thermal separation of a substance being fed into a treatment chamber. The substance comprises two or more components where at least one of the components is evaporable at an evaporation temperature $T_e$.

The separation apparatus comprises a vessel comprising a vessel wall with an inner surface enclosing the treatment chamber having a length $l_c$ and a height H and an outer surface. Note that the length $l_c$ and the height H are defined as the mean length $l_c$ and the mean height H across the chamber's extension perpendicular to and along the chamber's length direction, respectively.

The vessel further comprises a substance inlet for feeding the substance into the treatment chamber, a first outlet for releasing non-evaporated parts of the substance such as solid-state particles from the treatment chamber, a second outlet for releasing evaporated parts of the substance such as gas and/or vapor from the treatment chamber and a rotary mechanism.

The rotary mechanism includes a rotatable axle arranged at least partly within the treatment chamber along the treatment chamber's length $l_c$ (hereinafter abbreviated L direction) and a mixing device fixed to, and extending perpendicular from, the rotatable axle. Said rotatable axle is preferably arranged in alignment with a central axis $C_{TC}$ (mid position of the height H and a width W) of the treatment chamber along the L direction. Furthermore, said rotatable axle is preferably extending through a centre point of at least one of the vessel's terminal end along the L direction, where at least one of the ends of the rotatable axle is located outside the vessel's outer surface.

The separation apparatus further comprises a rotary drive operatively connected to or near an end of the rotatable axle and a heating device arranged outside the treatment chamber and the inner surface, for example at the outer surface and/or within the vessel wall. The heating device is configured to transfer thermal energy via the inner surface to a minimum peripheral volume $V_p$ within the treatment chamber.

The definition of the minimum peripheral volume $V_p$ is identical to the definition of the first aspect.

The rotary drive may be at least one of an electric motor, a combustion engine and a turbine.

The mixing device comprises a plurality of rotary discs fixed with axial offsets to the rotatable axle, with a preferred orientation radially symmetric around the rotational axis, and a plurality of elongated objects interconnecting the plurality of rotary discs.

The heating device and the rotary drive are configured such that, when both the heating device and the rotary drive are operated at their respective operational input powers $P_{hd}$ and $P_{rm}$, a resulting operational temperature $T_{op}$ is obtained within at least part of the minimum peripheral volume $V_p$, preferably the entire minimum peripheral volume $V_p$, which is equal or higher than the evaporation temperature $T_e$.

With this particular configuration, the separation apparatus enables evaporation of the component(s) evaporable at $T_e$ into a vapor cloud having a heat transfer rate being significantly higher than the mean heat transfer rate of the substance initially fed into the treatment chamber.

Moreover, it could be envisaged that the rotatable axle also could be connected to more than one rotating drive unit, for instance two electric motors, an electric motor and a combustion engine, etc.

The mixing device may further comprise a plurality of radially protruding elements distributed with offsets along the L direction. The term 'radially protruding elements' is herein defined as elements, preferably elongated elements such as rods, being oriented with a significant radial component. The radial component preferably constitutes more than 50% of the total length of the element, for example 100%.

The plurality of radially protruding elements such as rods may be connected to the plurality of elongated objects, most preferably replaceably connected by for example use of threads.

Further, the plurality of radially protruding elements may be arranged radially symmetric around the rotatable axle.

At least one of the plurality of radially protruding elements may comprise a disturbing means or structure at or near the end closest to the inner surface which is designed to enhance mixing rate of the substance. The disturbing means may for example take the shape of sharp edges, discs, hammer-shape, airfoil, etc. At least the latter two exemplary shapes should be oriented with head or leading edge pointed towards the rotational direction of the rotational mechanism.

In a preferable example, the rotary drive is configured to generate a peripheral rotation velocity that exceeds 5 meters per second, more preferably at or higher than 20 meters per second. The peripheral rotation velocity is measured at an outer, preferably outermost, radial boundary of the mixing device. Hence, if the mixing device comprises radially protruding elements, the outermost, radial boundary may be the disturbing means. Alternatively, or in addition, such boundary may be the elongated objects of the mixing device.

At a peripheral rotation velocity of 20 meters per second or higher, a turbulent flow characteristic is created for at least part of the substance within the minimum peripheral volume $V_p$. If the goal is to create a turbulent flow characteristic, the main purpose of the mixing device is not to transform kinetic energy to frictional heat, but to reach and maintain a turbulent vapour cloud inside the treatment chamber and (at the same time) secure a continuous heat transfer from the vapor cloud and onto the incoming substance by agitating the substance inside the treatment chamber so that solids contained in the incoming substance are continuously suspended in the generated vapour cloud.

The heating device may be configured to provide at least 60% of the total thermal energy required to reach and maintain the operational temperature $T_{op}$ within the at least part of the minimum peripheral volume $V_p$, more preferably at least 65%, even more preferably at least 70%, for example 75%. The remaining part of the total thermal energy is thus generated by the rotational movement of the rotatory mechanism.

In one exemplary configuration of the separation apparatus, the treatment chamber has a cylindrical shape with a radial diameter $d_c$ (or mean radial diameter $d_c$ if not constant), and where the ratio between the length $l_c$ and radial diameter $(l_c/d_c)$ is equal or less than 4.0, even more preferably equal or less than 2.5, even more preferably equal or less than 2.0, even more preferably equal or less than 1.5, for example 1. This configuration is considered advantageous due to reduced cost and higher compactness, and since the separation apparatus allows for instantaneous, or near instantaneous, heating and evaporation within the minimum peripheral volume $V_p$ (and thereby also evaporation), there is no need for exceeding a certain chamber length to complete the separation process.

In addition, or alternatively, to the above exemplary configuration, the mixing device may be arranged and designed such that it does not contribute to a net transport of the substance along the L direction from the inlet to the outlets. For example, the shape of the disturbing means and/or the elongated objects may be such that no or an insignificant amount of the substance is pushed along the L-direction.

In another exemplary configuration, at least one of the plurality of rotary discs displays at least one through-going opening for allowing the evaporated parts of the substance to flow through during operation. At least one of these through-going openings may be designed radially symmetric around the rotational axis. Moreover, the at least one through-going opening may be arranged at the radial half of each rotary discs located closest to the rotatable axle.

In a specific configuration, the rotary disc located nearest the vessel's terminal end with the substance inlet is compact, i.e. without any through-going openings, while the remaining discs displays such openings. It is thereby ensured that no or insignificant amount of the non-evaporated parts of the substance are allowed to flow out of the vessel at the second outlet.

The vessel may further comprise a plurality of inner ribs arranged on at least part of the inner surface, thereby increasing the surface area of the treatment chamber as well as increasing the generation of turbulence of the substance within the minimum peripheral volume $V_p$. Each of the inner ribs is protruding radially into the treatment chamber. The plurality of ribs is preferably distributed with offsets around the circumference of the inner surface, in particular on the inner wall oriented along the L direction.

In yet another exemplary configuration, the heating device further comprises an enclosure arranged around the vessel such that a void is created between an outer surface of the vessel wall and an inner surface of the enclosure. The enclosure comprises a heat inlet and a heat outlet for feeding heated fluid into the void and releasing heated fluid out from the void, respectively. At least a part of the void may also comprise a plurality of outer fins extending in direction perpendicular to the L direction, thereby increasing the surface area of the outer wall, causing the heat to be transferred more efficiently into the vessel wall. The outer ribs may be fixed to the outer surface of the vessel wall and/or on the inner surface(s) of the enclosure.

The heated fluid going through the void via the heat inlet and the heat outlet may be at least one of steam, hot vapor, molten matters, heated liquid, surplus exhaust from a generator and surplus exhaust from an engine, turbine and/or incinerator.

Alternatively, or in addition, the heating device may comprise at least one heating element, for example at least one electric heating element, arranged within the vessel wall, for example in form of heating rods inserted into heating channels extending along the L direction. Such heating rods may be distributed with offsets around the circumference of the vessel.

Alternatively, or in addition, the heating device may comprise an electric heating element, a microwave heater and/or an induction heater arranged around the outer surface of the vessel.

The separation apparatus may further comprise a feeding device for feeding the flow of the substance into the treatment chamber at a flow $S_i$, a scrubber for scrubbing evaporated parts of the substance released from the second outlet during operation and a solid discharge tank for collection of non-evaporated parts released from the first outlet during operation.

The flow $S_i$ may be measured as a flow rate in kg/h if averaged over an appropriate period, for example 1 min or 10 min or 30 min or 1 hour or 3 hours.

In cases where the thermal energy is derived from a surplus source, the present invention could enable substitution of other energy inputs, and thereby reduce the operational energy cost significantly and/or cause a substantial reduction in emissions of $CO_2$ equivalents.

The conceptual idea of the invention is to create sufficient heat transfer from an external heat source and onto the substance to be evaporated inside a closed vessel such that the evaporation takes place instantly or near instantly. This is in clear contrast to traditional indirect method where the evaporation takes place more gradually.

Such instant, or near instant, evaporation is achieved by the inventive separation apparatus since the heat from the external heat source is not transferred mainly to the solids in the substance (e.g. waste), but instead to a 'vapor cloud' containing evaporated liquids and (already) dried solid particles. If the substance injected into the vessel contains water, the 'vapor cloud' typically contains a high amount of steam.

The heat is subsequently transferred from this heated vapor cloud onto the incoming substance under mixing by the mixing device. To ensure a high heat transfer, this mixing should advantageously be very intense and up to point where the components making up the vapor clouds experiences turbulence flow characteristics, that is high internal velocities with rapid accelerations/change of directions.

As mentioned above, the intense mixing/turbulence is achieved by inserting a rotary mechanism into the treatment chamber. One purpose of the rotary mechanism is to secure an optimal mixing and to create, together with the above-mentioned heating system, a vapor cloud to secure an optimum heat exchange from the vessel wall and onto the various components of the vapor cloud. Hence, an instant, or near instant, evaporation of the evaporable components within the substance is achieved.

As a consequence, in at least one preferred embodiment, the vessel contains, at all times during operation, a vapor cloud with optimal heat transfer capabilities, both from the inner walls and further onto the incoming substance.

Although solid-state particles are forced to the periphery of the vessel (i.e. within the above-mentioned minimum peripheral volume $V_p$) due to centrifugal forces, the continuous evaporation of evaporable components such as water creates strong internal forces in all internal directions, thereby securing a high percentage of evaporated liquids also at $V_p$.

By creating and maintaining intense mixing/turbulence against the inner walls of the vessel, the inner surfaces are kept clean. This cleaning process further aids the aim of achieving continuous optimal heat transfer capabilities during operation. Due to the mixing, solid-state particles will not be able to build up a layer on the inner surfaces since these surfaces are continuously "washed" by the vapor cloud containing both evaporated liquids and solid-state particles. The intense mixing also counteracts the gravity forces, further ensuring that the entire inner surface(s) can be used for transferring of heat.

As a consequence of the instant evaporation and the intense mixing/turbulence, the separation apparatus can operate continuously without an internal transport mechanism gradually heating the substance.

According to one exemplary embodiment of the invention, the vessel may be arranged in a substantially horizontal position. However, a person skilled in the art would know that the vessel also could be arranged in a substantially vertical position, or in any position between the substantially horizontal and substantially vertical position.

The combination of the heating device and the rotary mechanism sets up a thermal desorption unit that will ensure a significantly more efficient heat transfer than known indirect thermal solutions. The mixing device will, through its rotation, disperse and stir up the substance, thereby providing a "vapour cloud effect" inside the treatment chamber.

The intense mixing of the "vapour cloud" inside the treatment chamber will result in that primarily the steam and other evaporated liquids, but also the solids and particles of the waste, will be brought into contact with the inner surfaces of the treatment chamber for a very short period of time, where-after the vapour and particles are moved out of contact with the inner surface and replaced by other and new vapour and particles continuously.

In at least one embodiment of the invention, the heat transfer from the inner surfaces of the treatment chamber takes place as follows:

- The mixing device creates an intense mixing (preferably turbulence) in the substance components present in the treatment chamber, thereby providing (in addition to the heating device) a vapour cloud. The vapour cloud may comprise vapor (e.g. water vapor and vapor from other vaporized liquids such as oil) and solids/particles.
- This intense mixing against the inner surfaces provides high heat transfer from the inner surfaces and to the vapour cloud.
- The heat (thermal energy) exchanged from the inner surfaces of the treatment chamber will immediately, or almost immediately, be distributed to the entire vapour cloud due to the intense mixing.

As mentioned above, the intense mixing, in combination with the solids and particles in the vapour cloud, will keep the heating surfaces clean at all times, thereby enhancing the heat transfer from the inner surfaces of the treatment chamber and to the vapour cloud. The strong stirring of the vapour cloud will make sure that all, or nearly all, of the substance present inside the treatment chamber contains dried solids and vapor having almost the same composition (i.e. ratio between the different components) and temperature.

Furthermore, the inner surface, at least along the L-direction, is heated and in contact with the vapour cloud. It is therefore avoided that only the bottom area of the vessel is active in transferring heat to the substance as the case will be in other known indirect methods. A larger effective heating surface is therefore obtained compared to prior art solutions since the heat will be transferred to the vapour cloud, and since the vapour cloud due to the mixing will be in contact with the entire heating surface of the treatment chamber.

The treatment chamber may be set at an atmospheric pressure. Alternatively, the treatment chamber pressure may be below an atmospheric pressure, for example at a pressure at or below 0.3 bar.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
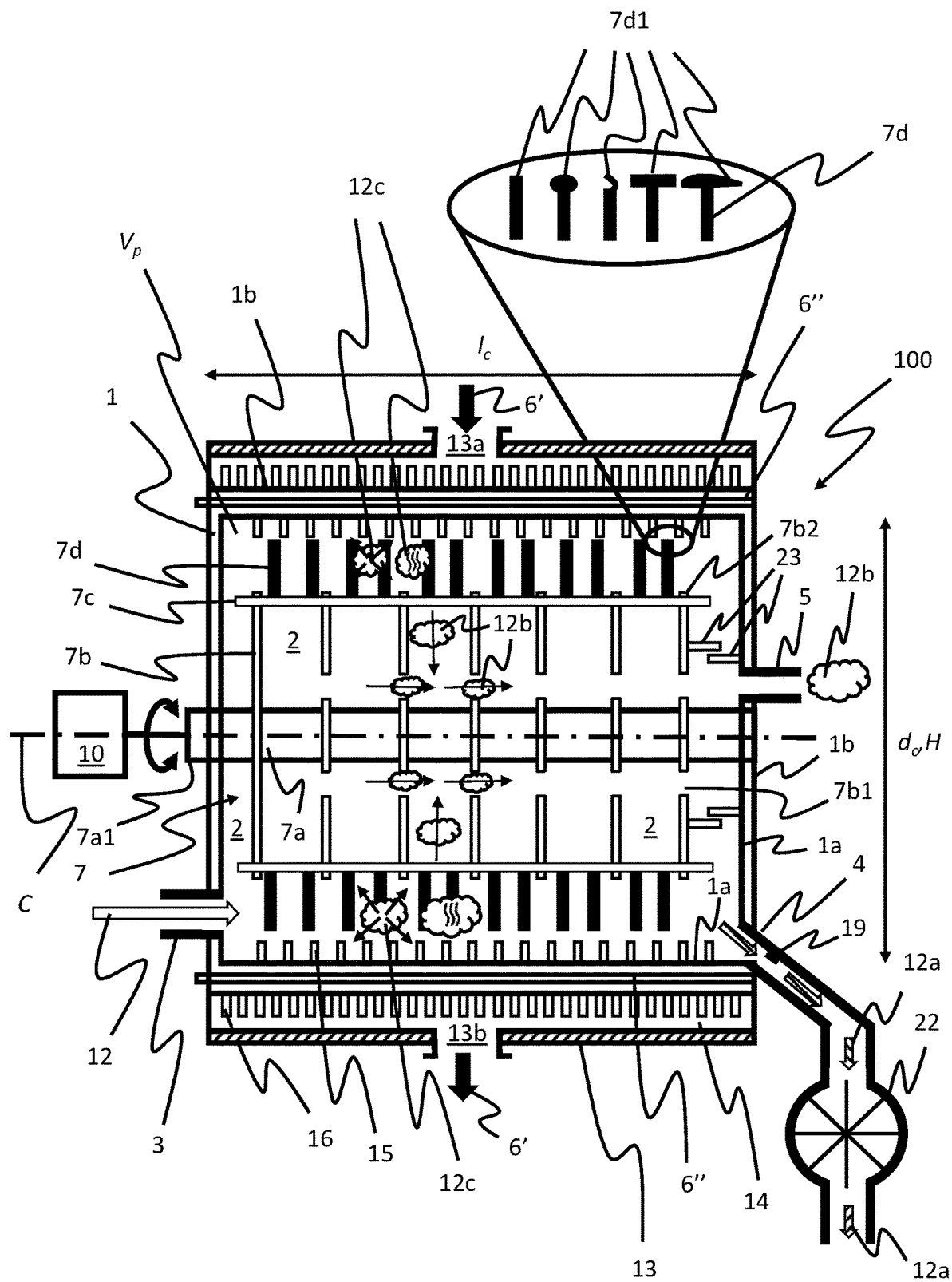
FIG. 1 is a schematic side view of a separation apparatus according to the invention.

In the following, embodiments of the invention will be discussed in more detail with reference to the appended drawings. It should be understood, however, that the drawings are not intended to limit the invention to the subject-matter depicted in the drawings.

It is appreciated that certain features of the invention, which, for clarity, are described in the context of separate embodiments, may also be provided in combination in a single embodiment. Conversely, various features of the invention, which, for brevity, have been described in the context of a single embodiment, may also be provided separately or in any suitable sub-combination. In particular, it will be appreciated that features described in relation to one particular embodiment may be interchangeable with features described in relation to other embodiments.

With particular reference to FIG. 1 showing a first embodiment of the invention, the separation apparatus 100 is configured to perform continuous thermal separation of a substance 12 flowing into a treatment chamber 2 inside a cylindrical vessel 1 having an inner surface 1a and an outer surface 1b. The vessel includes a cylindrical wall of length $l_c$ and two circular end walls of diameter $d_c$ (or alternatively oval or rectangular or squared with height H and width W) arranged on each ends of the cylindrical wall.

The substance 12 fed into the substance inlet 3 by use of a feeding device 20 (FIG. 2) is composed of multi-components ($A_n$, where n>1), where one or more of these components 12b ($A^e_m$, where m≤n) are evaporable with distinct evaporation temperatures ($T^e_i$, where i=1 ... m). Hence, a part 12a of the substance 12 ($A_{n-m}$) may be considered non-evaporable within a set operational temperature ($T_{op} \geq T^e_i$) inside the treatment chamber 2. The non-evaporable and the evaporable parts 12a, 12b are released from the vessel 1 through a first and second outlet 4, 5, respectively. During operation a vapor cloud 12c is formed comprising a mix of non-evaporable parts 12a and evaporable parts 12b. Said vapor cloud 12c includes both fluids (gas and/or liquids) and solids/particles.

The vessel 1 contains a rotatory mechanism 7 having a rotatable axle 7a aligned with a central, longitudinal axis $C_{TC}$ of the vessel 1. The axle 7a extends across the length $l_c$ of the vessel 1 and through at least one of the end walls, preferably both.

The rotatory mechanism 7 further includes a mixing device 7b-d fixed to the rotatable axle 7a inside the treatment chamber 2. The mixing device 7b-d comprises at least one, preferably at least two, rotary sheaves or discs 7b rigidly fixed perpendicularly onto the axle 7a and a plurality of mixing protrusions/protruding elements **7*d* fixed at the outer radial end of the discs 7*b*. In case of a plurality of discs 7*b*, these are arranged with spacings/offsets along the axle's 7*a* longitudinal direction (i.e. along axis C). In FIG. 1, a total of seven spaced-apart discs 7*b* are shown, where all discs except the leftmost disc displays openings 7*b*1 near the axle 7*a*, thereby allowing evaporated components 12*b* to flow therethrough. The main purpose of the single closed disc 7*b* arranged nearest the end wall displaying the substance inlet(s) 3 (see FIG. 7) is to hinder the solids from the vapor cloud 12*c* to enter the volume between the rotatable axle 7*a* and the protruding elements 7*d*, thereby avoiding solids to mix with evaporated parts 12*b* and to be released through the second outlet 5**.

To further prevent solids from escaping the second outlet 5, a narrow slit composed of two circumferentially extending plates 23 have been fixed to the disc **7*b* nearest the second outlet 5 and the adjacent inner wall 1*a***, respectively.

The mixing device **7*b-d* further comprises a plurality of bars 7*c* fixed at or near the discs' 7*b* outer rims 7*b*2, where each of the bars 7*c* has a length and an orientation directed along (parallel with) the vessel's 1 central axis $C_{TC}$ which allows interconnection of two or more of the discs 7*b*, and preferably interconnections of all of the discs 7*b***.

For the first embodiment depicted in FIGS. 1-6, the mixing device **7*b-d* also comprises a plurality of rods 7*d* replaceably connected to each bar 7*c* such that they protrude radially towards the inner surface 1*a* of the vessel's 1 cylindrical wall, i.e. perpendicular to the vessel's 1 central axis $C_{TC}$. The main purpose of the rods 7*d* is to create intense mixing of the vapor cloud 12*c* to enhance the heat transfer from the inner wall 1*a***.

With the particular configuration shown in FIG. 1, experiments show that an intense mixing of the vapor cloud **12*c* was achieved with a peripheral velocity $v_p$ of 34.5 m/s measured at the ends of the rods 7*d* closest to the inner vessel walls. During the experiments, a mixing device 7*a-d* with sets of eight rods 7*d* ($\#_{mp}$=8) distributed with spacings along the entire mixing device length $l_{md}$. The eight rods 7*d* of each set is further distributed with spacings along the entire circumference of the mixing device 7*b-d*. The mixing device 7*b-d*** had a diameter $d_{md}$ of 1.1 m and the inner vessel diameter $d_c$ was 1.2 m.

A peripheral velocity of 34.5 m/s with this particular configuration corresponds to a revolution velocity $\omega_{rev}$ of 600 rounds per minutes (r.p.m). With eight rods **7*d* along the mixing device's circumference, this corresponds to 4800 sweeps per minute (s.p.m.) across a specific area of the inner vessel wall 11*a***.

If one decide to keep the number of sweeps constant, it can be deduced that the minimum peripheral rotation velocity $v_{p,min}$ at the outer radial boundary of the rods/mixing protrusions can be formulated as follows:

$$v_{p,min}=80\pi(d_{md}/\#_{mp}),$$

where $d_{md}$ is the diameter of the mixing device and $\#_{mp}$ is the number of mixing protrusions.

Further experiments show that vapor cloud with turbulent characteristics can be achieved with a number of s.p.m. significantly lower than 4800, at least down to 2700 s.p.m. This corresponds to a minimum peripheral rotation velocity of $$v_{p,min}=45\pi(d_{md}/\#_{mp}),$$

Figure 6:
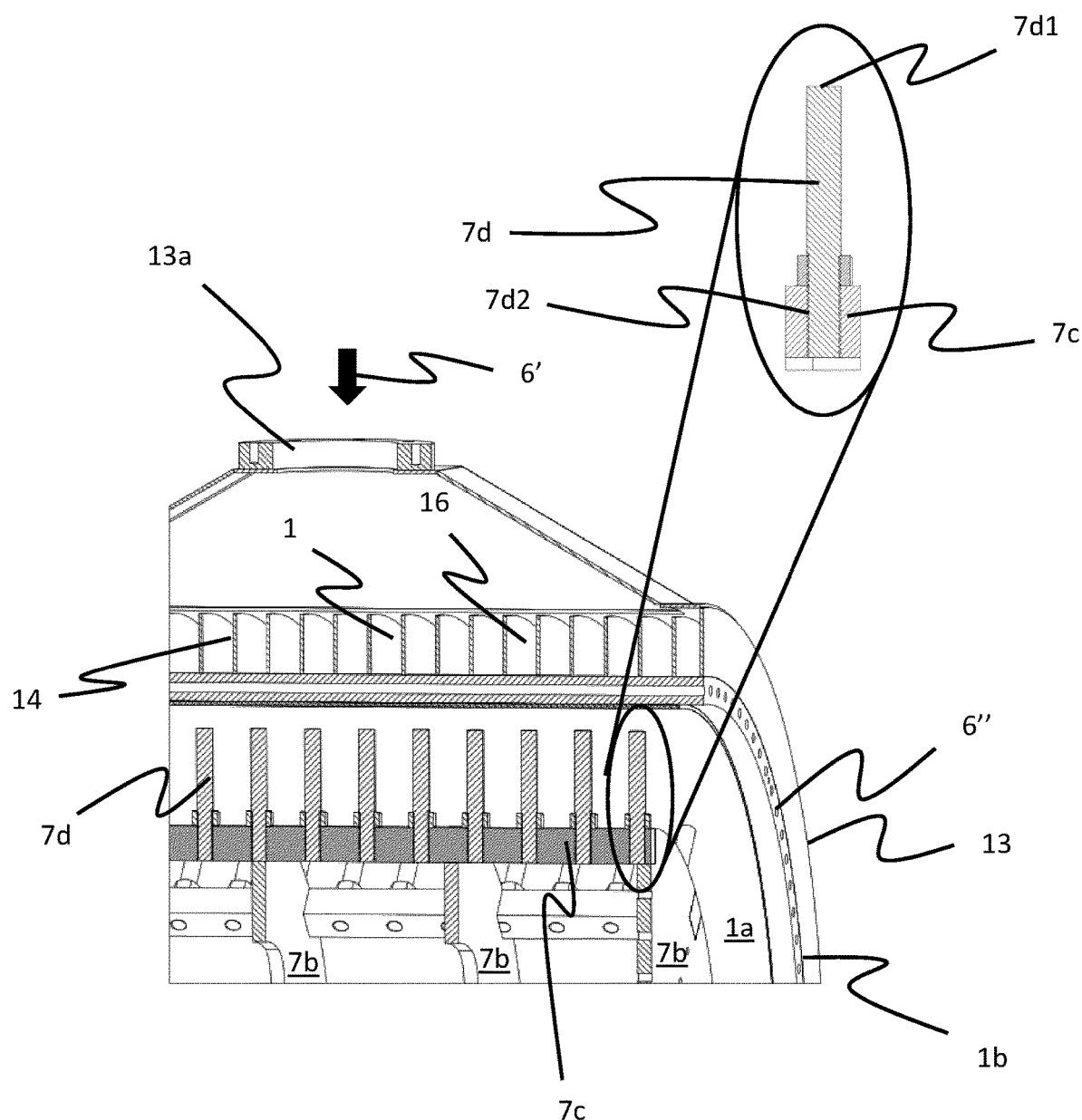
FIG. 6 is a perspective cut-off side view of a peripheral part of the separation apparatus shown in FIG. 3, wherein one radially protruding element is shown in further details in a separate drawing.

With particular reference to FIG. 6, the shape of the end **7*d*1 of each rod 7*d* situated nearest the inner surface 1*a* may be varied to optimize said mixing of the vapour cloud in a minimum peripheral volume $V_p$ delimited by the radial extent of the rotary mechanism 7 and the inner surface 1*a*. As shown in the detailed drawings within the oval frame of FIG. 6, the termination of the rod 7*d* may be flat, or near flat, relative to the facing inner surface 1*a*. However, the ends 7*d*1 may be of any shape as long as they contribute to the mixing of the vapor cloud 12*c* present in the minimum peripheral volume $V_p$. The detailed drawing within the oval frame in FIG. 1 shows various examples of possible shapes of the ends 7*d*1. Note that the exemplary rods 7*d* within the oval frame of FIG. 1 are all turned 90° counterclockwise in respect of the rods 7*d* shown within the vessel 1**.

Figure 2:
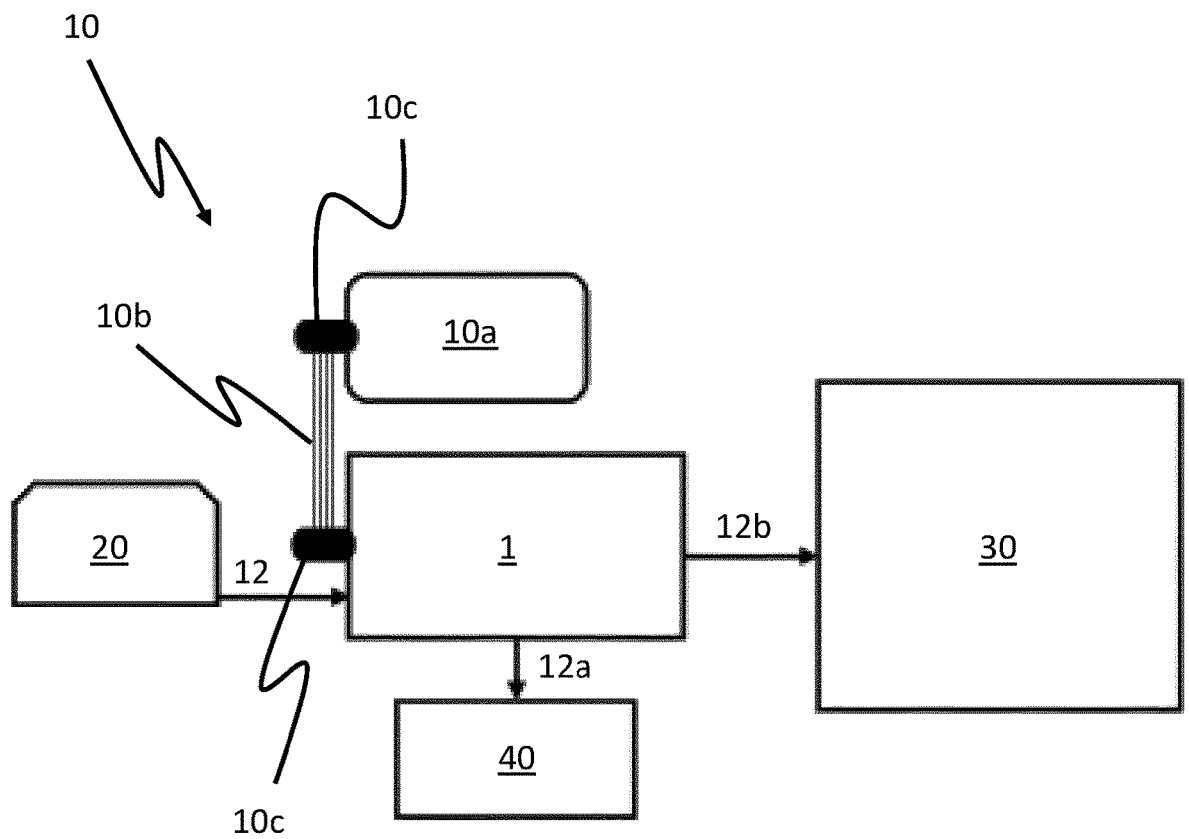
FIG. 2 is a schematic side view of a separation assembly according to the invention.
Figure 3:
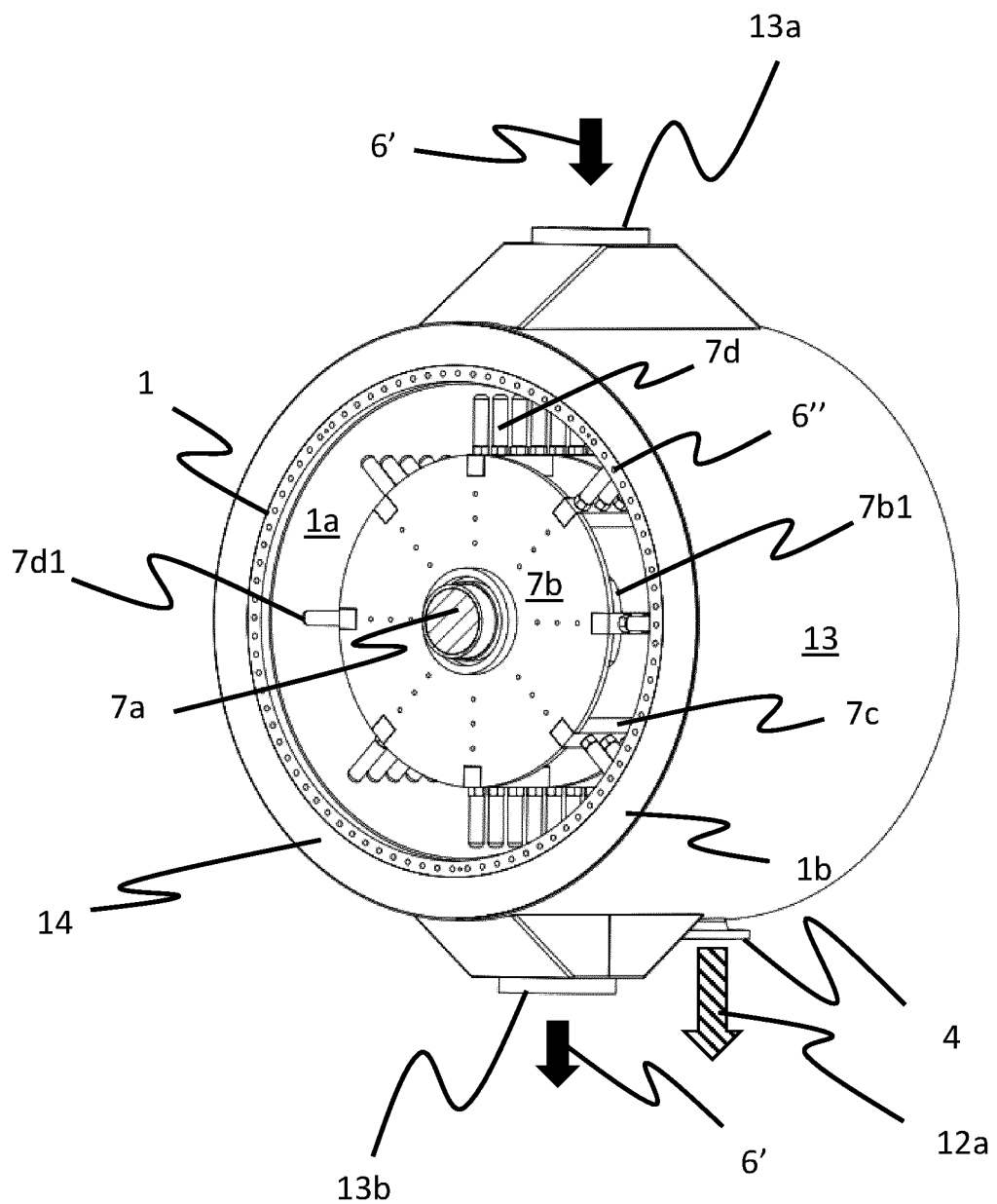
FIG. 3 is a perspective cut-off side view of a first embodiment of a separation apparatus according to the invention.
Figure 4:
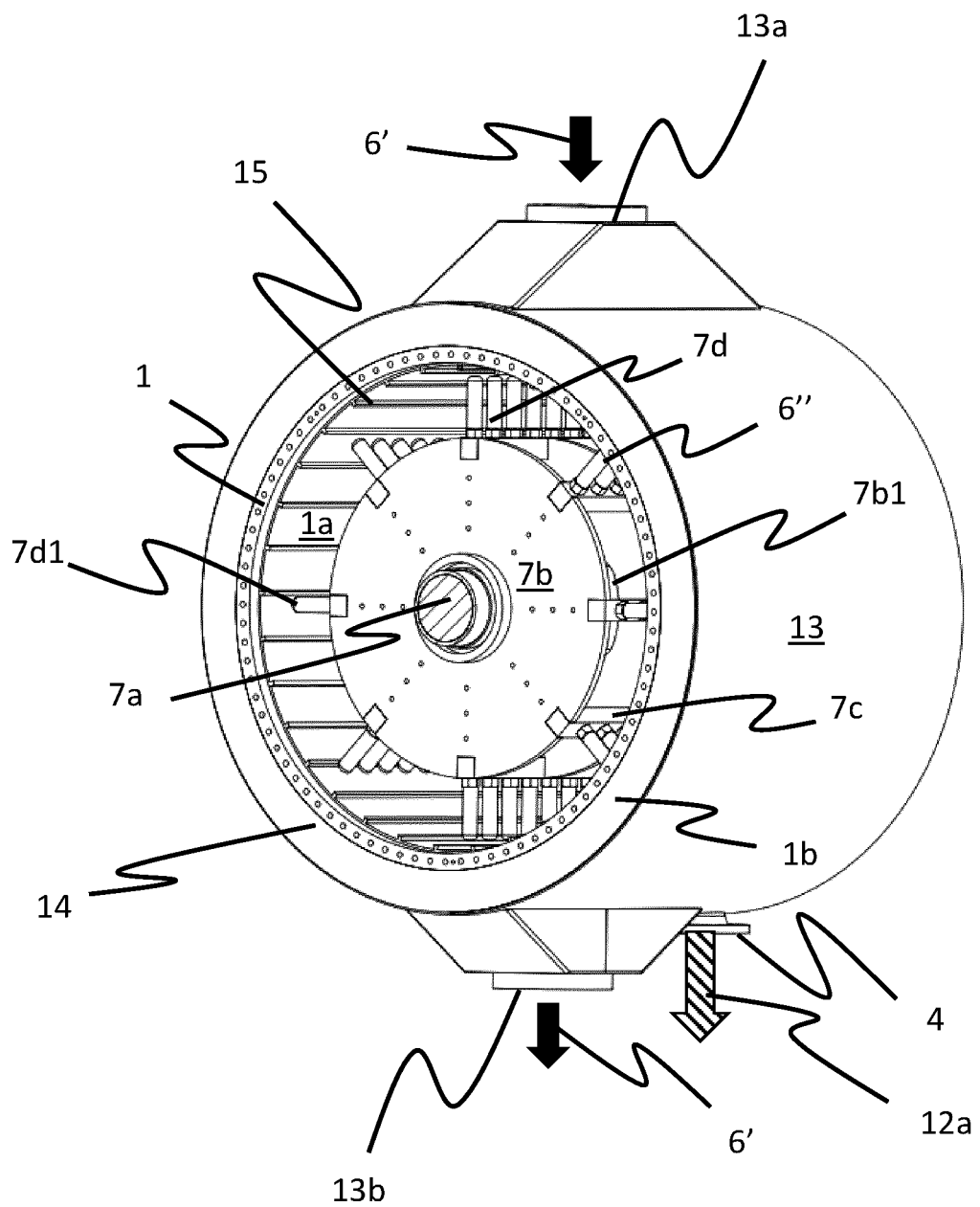
FIG. 4 is a perspective cut-off side view of the separation apparatus of FIG. 3, wherein inner ribs are arranged on the vessel's inner surface.
Figure 5:
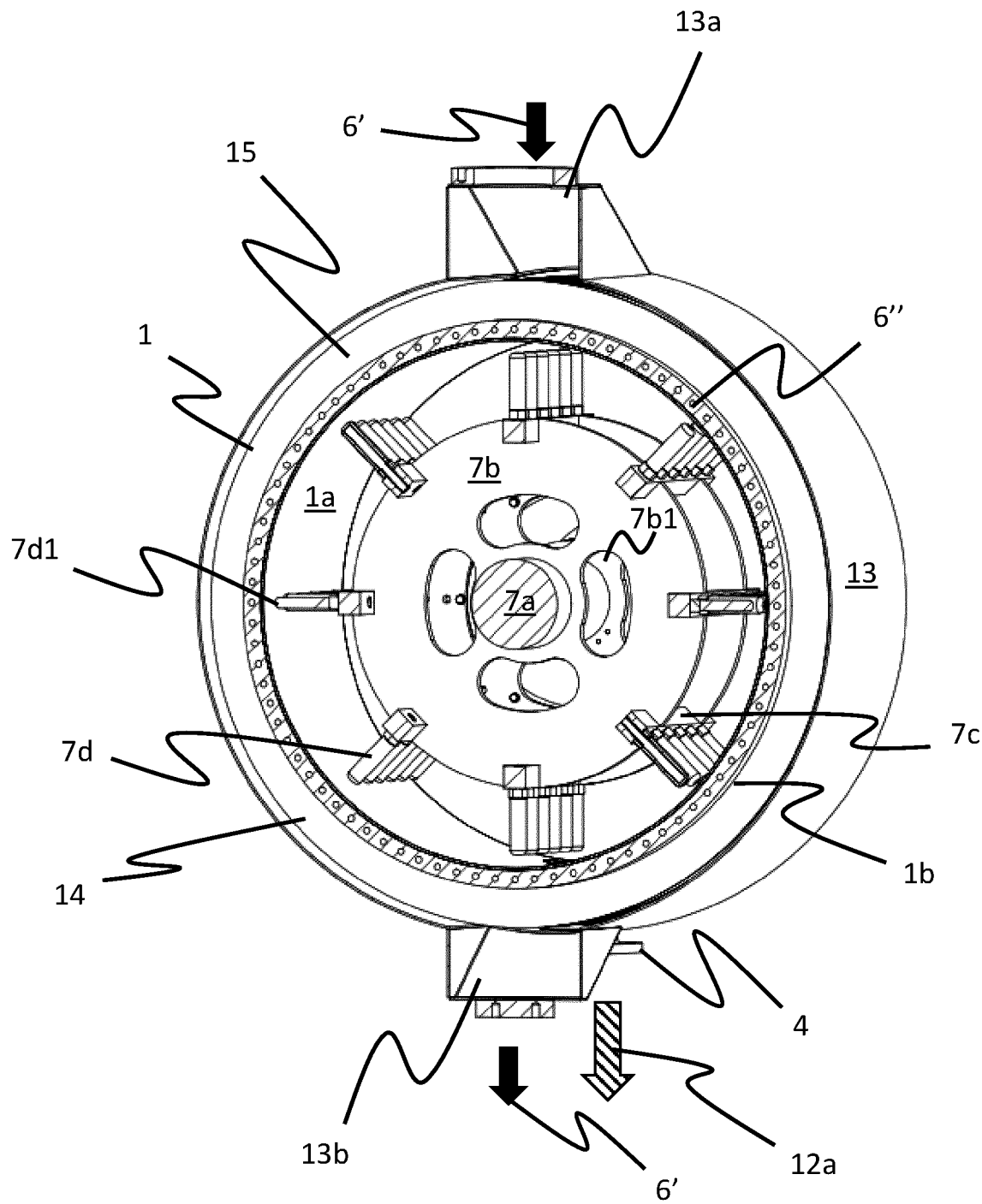
FIG. 5 is a perspective cut-off front view of the separation apparatus of FIG. 3, wherein the cut-off plane is located further into the apparatus' vessel.

To ensure rotation of the rotatory mechanism 7, and thereby also the mixing device **7*b-d*, an end section 7*a*1 of the axle 7*a* is connected to a rotary drive 10. As shown in FIG. 2, the latter is powered by an internal and/or external rotary motor 10*a*. In the exemplary configuration shown in FIG. 2, the rotary drive 10 comprises a rotary motor 10*a*, a transmission belt 10*b* and two transmission pulleys 10*c* arranged around the end section 7*a*1 and a rotatable axle of the rotary motor 10*a***, respectively.

The first outlet 4 is dedicated for releasing solid-state particulates (non-evaporated parts) **12*a*, while the second outlet 5 is dedicated for releasing the evaporated parts 12*b*. In order to avoid release of vapor out of the treatment chamber 2 through the first outlet 4, a rotary valve 22 (FIG. 1) is fixed to the first outlet 4, thereby discharging the non-evaporated parts 12*a* from the first outlet 4**.

After being released from the first outlet 4 through the rotary valve 22, the non-evaporated part **12*a* may be collected by a dedicated solid discharge container 40 arranged below, or partly below, the vessel 1 (FIG. 2**).

In order to monitor the temperature inside the vessel 1, one or more temperature sensors 19 at various locations may be arranged within or near the treatment chamber 2, for example outside or within the vessel wall and/or within the first outlet 4. The latter position is depicted in FIG. 1.

The vapor **12*b* may be fed into a condensing system 30**. The latter may be performed in three steps:

- The vapor **12*b* is flowing into a gas scrubber to clean the vapor 12*b*** for minor amounts of solid-state particulates. A small amount of a first liquid such as oil may also be condensed within the gas scrubber.
- The cleaned vapor **12*b* is further flowing into a liquid condenser, for example an oil condenser, to condense the first liquid from the vapor 12*b***.
- Lastly, the cleaned vapor having no or reduced amount of the first liquid (for example lighter oil) is flowing into a steam condenser which condense at least a second type of liquid such as water and, if applicable, the reduced amount of the first liquid.

In FIG. 1, the first outlet 4 and the second outlet 5 are seen arranged adjacent the end wall distal the rotary drive 10, wherein their openings out of the vessel 1 are directed along the central axis $C_{TC}$ and tilted down relative to the central axis $C_{TC}$, respectively. However, the first and second outlets 4, 5 may be configured in any direction as long as they allow release of non-evaporated and evaporated parts **12*a*, 12*b* during operation. FIGS. 3-5 and 7 of the first embodiment and FIGS. 8-9 of the second embodiment show an alternative configuration of the first outlet 4 having a vertical opening out from the treatment chamber 2 at the vessel's 1** base.

The total radial diameter $d_{md}$ of the rotatory mechanism 7/mixing device **7*b-d*, i.e. twice the total radial length from the central axis $C_{TC}$ to the rotatory mechanism's 7 radial boundary, is preferably more than 90% of the diameter $d_c$ of the treatment chamber 2. For example, if the inner diameter $d_c$ of the cylindrical vessel 1 is 2 meters, the average distant between the end 7d1 of each plurality of rods 7d and the inner surface 1a** should preferably be less than 10 cm, for example 3 or 4 cm.

In all of the exemplary configurations of FIGS. 1 and 3-9, a heating device 6 is depicted as an assembly comprising both
- a plurality of resistive heating elements in the shape of poles/rods 6" arranged within the vessel wall along (i.e. parallel with) the central axis $C_{TC}$ and
- a hot fluid system arranged around the cylindrical wall comprising an enclosure 13 forming a void 14 between an inner surface of the enclosure 13 and the outer surface 1b of the vessel 1. The enclosure 13 further comprises a heat inlet 13a for feeding heated fluid 6' into the void 14 and a heat outlet 13b for releasing the heated fluid 6' out of the void 14.

However, note that the heating device 6 may comprise any types and any number of heating mechanisms capable of heating the inner wall 1a of the vessel 1. For example, in alternative embodiments the heating device 6 may consist of only one or more resistive heating elements within and/or outside the container wall or consist of only said hot fluid system. The heating device 6 may alternatively, or in addition, comprise a microwave heater system and/or an induction heater system arranged on or near the outer surface 1b of the vessel 1 and/or inside the treatment chamber 2.

Figure 7:
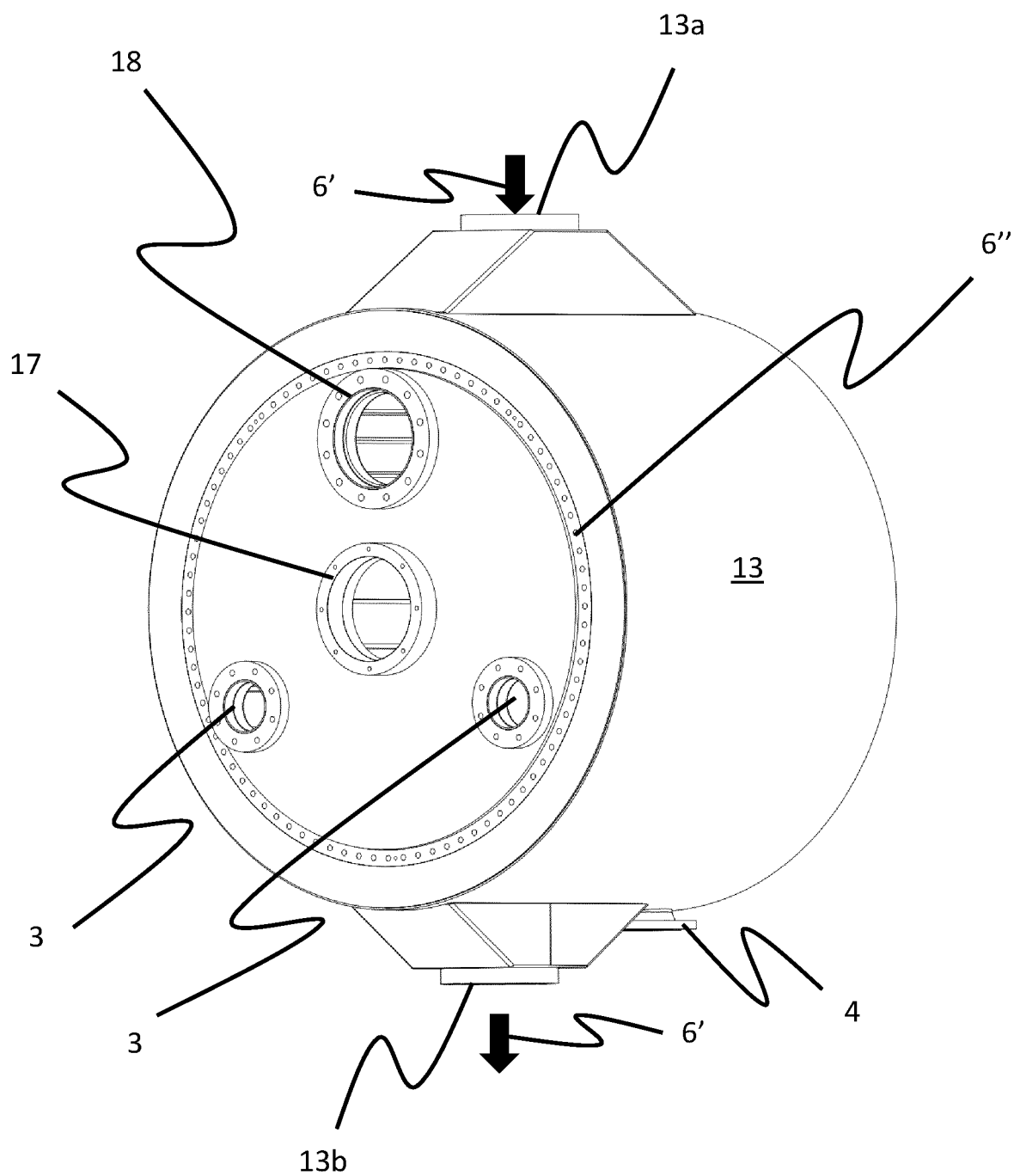
FIG. 7 is a perspective side view of the separation apparatus of FIG. 3-5.

FIG. 7 shows a separation apparatus 100 where one of the end walls of the vessel 1 displays two substance inlets 3, an opening for the rotatable axle 7a and an inspection/service hatch 18. It should however be understood that this end wall may comprise any number of substance inlets 3 and any number of hatches 18. For the particular configuration shown in FIG. 7, only one of the two substance inlets 3 are used during operation. The other may be closed, for example by the same material as the remaining part of the vessel 1 or with transparent glass. Alternatively, the substance 12 may be fed through both inlets 3 during operation.

The black arrows 6' pointing into the heat inlet 13a and out of the heat outlet 13b, respectively, symbolize the flow of hot fluid.

Figure 8:
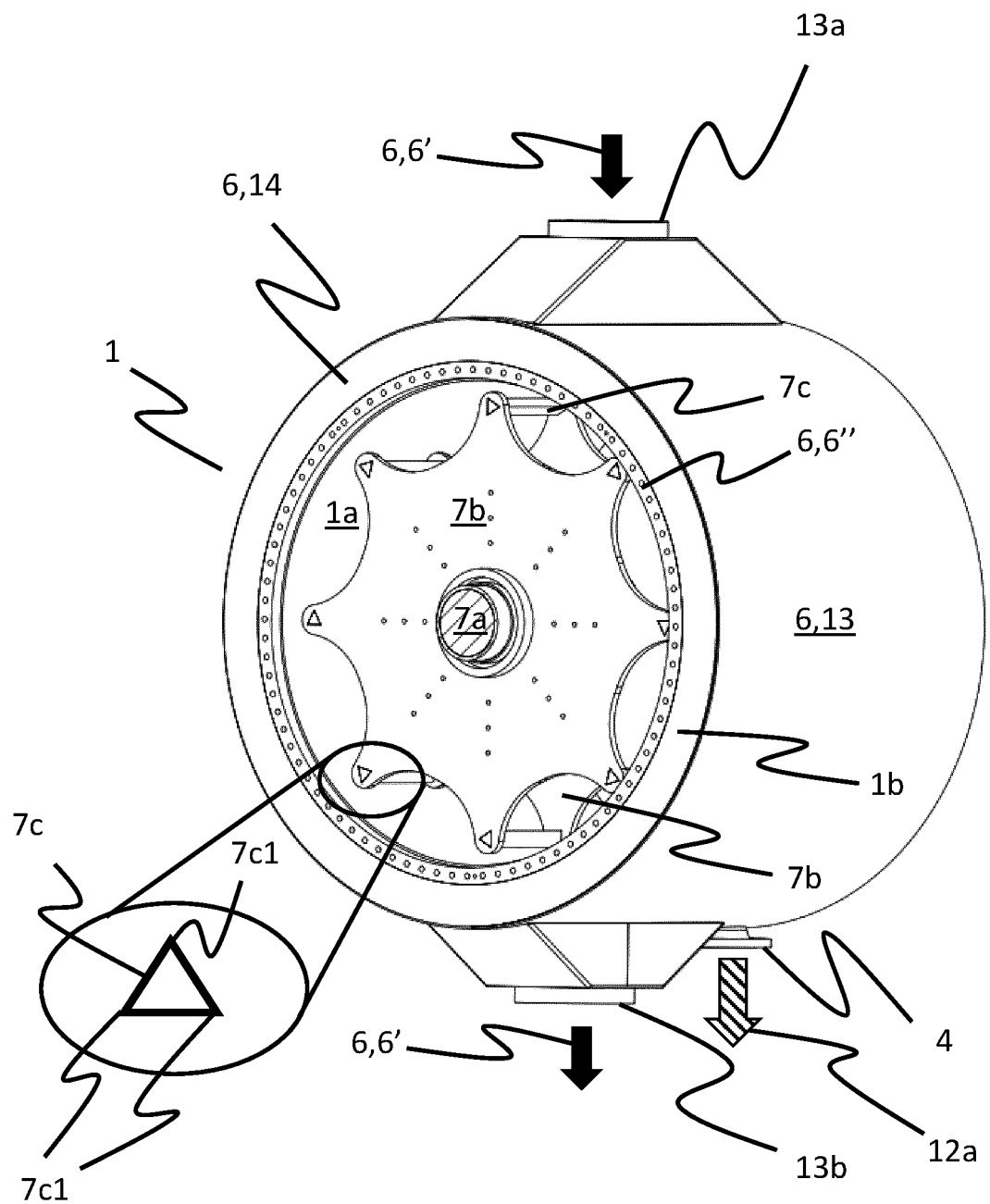
FIG. 8 is a perspective cut-off side view of a second embodiment of a separation apparatus according to the invention, wherein one turbulence generating elongated object is shown in further details in a separate drawing.
Figure 9:
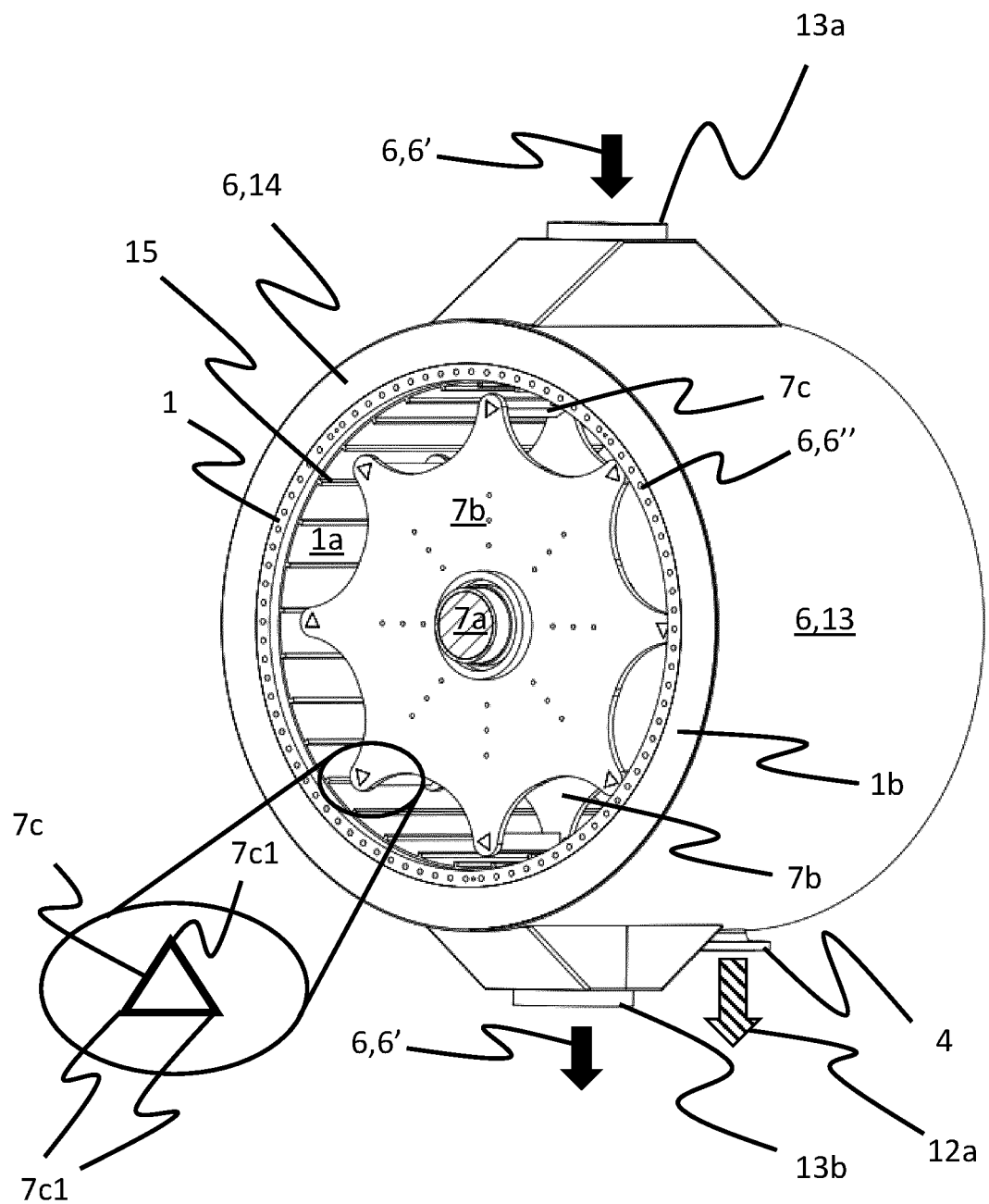
FIG. 9 is a perspective cut-off side view of the separation apparatus of FIG. 8, wherein inner ribs are arranged on the vessel's inner surface.
Figure 10:
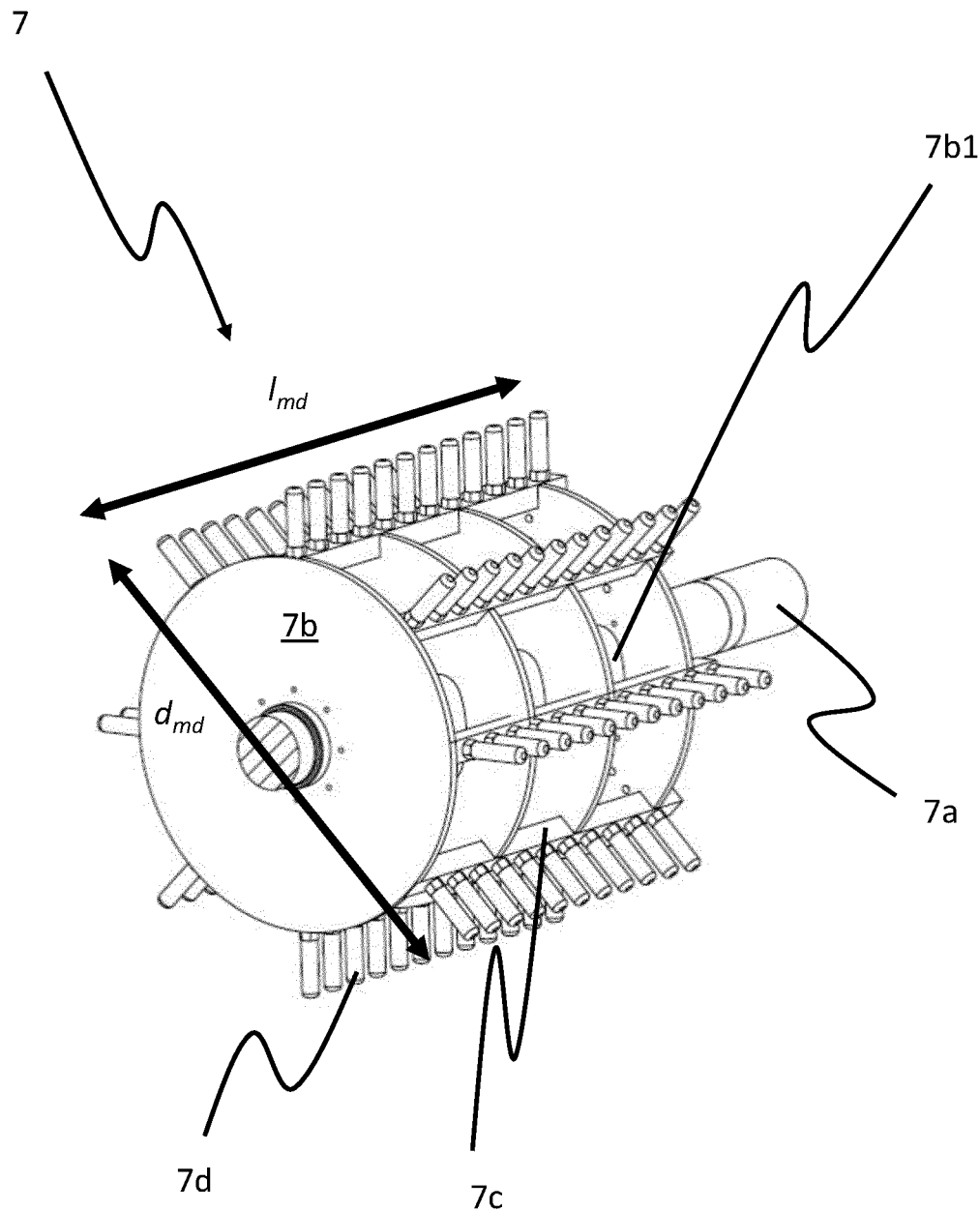
FIG. 10 is a perspective side view of a rotary mechanism of a separation apparatus according to the invention.

FIGS. 8 and 9 show a second embodiment of the separation apparatus 100. Compared to the first embodiment, the plurality of rods 7d are omitted. The rotary mechanism 7 thus comprises the rotatable axle 7a and the mixing device 7c-d, where the latter is set up by a plurality of discs 7b and interconnecting bars 7c. The desired mixing of the substance 12 within the minimum peripheral volume $V_p$ is consequently largely ensured by the longitudinally directed bars 7c.

To enable maximized mixing, preferably to the extent that the vapor cloud 12c experiences a turbulent flow characteristic within $V_p$, the shape of the bars 7c may be optimized, for example through repeated testing in which various shapes of the bars 7c are inserted and operated, and where the heat transfer is measured during each operation. FIGS. 8-9 show one exemplary configuration of the bars 7c where the longitudinal cross-sectional area displays has a triangular shape. The sharp edges 7c1 of the triangular bar 7c may induce more turbulence in the minimum peripheral volume and intense mixing of the vapour cloud 12c.

The above described separation apparatus 100 enables effective removal of liquids and/or gases from a substance 12 by thermal separation, using for example waste heat 6' as the main indirect energy for separation of waste and bi-products. Due to the combined external heating of the vessel 1 and the fierce mixing of the substance components/vapor cloud 12c, the separation apparatus 100 can operate continuously without the presence of a net internal transport mechanism causing a gradual heating of the substance 12 (as necessary in the currently known indirect separation methods).

By use of the above described apparatus 100, the heat is not transferred mainly to the solids in the waste, as case is for indirect separation methods. Instead, the heat is transferred to the vapor cloud 12c having much higher heat transfer coefficient. This vapor cloud 12c is composed of mainly (by volume) evaporated liquids/gases, and also hot non-evaporated particles. If water is present in the incoming substance 12, the 'evaporated' vapor cloud 12c will necessarily contain steam.

During operation, the following process steps take place:
- The heating device 6 and the rotary mechanism 7 cause the incoming substance 12 to transform into a vapor cloud 12c.
- The thermal energy from the heating device 6 is transferred from the inner surface 1a of the vessel 1 to the generated vapor cloud 12c.
- The thermal energy is subsequently transferred from this heated vapor cloud 12c onto the incoming substance 12 by intense mixing/turbulence from the rotary mechanism 7.

The heat transfer from steel to a dried solid typically found in prior art indirect heating separators is experienced to be ca. 75 W/m²K. In comparison, the heat transfer from steel to steam (which will be a typical main ingredient of the vapor cloud 12c during thermal separation of waste) is significantly higher, typically ca. 6000 W/m²K.

Hence, by heating the substance 12 via the above-mentioned heating steps the inventive apparatus achieves a heat transfer capacity significantly higher than 75 W/m²K (but below 6000 W/m²K).

The final heat transfer will depend inter alia on the water content. For example, a heat transfer coefficient between 1000 and 1200 W/m²K has been verified when thermal separation tests have been performed on a substance containing approx. 15% water, 15% oil and 70% non-evaporable substance (by weight). The latter is typical composition for cuttings after drilling operations.

As mentioned above, the intense mixing/turbulence mechanism will secure an optimal mixing and heat exchange from the vapor cloud 12c onto the continuously fed substance 12 through the substance inlet 3 and the various components in this substance, thereby causing an almost instant evaporation of in particular liquids within the substance 12. The vessel 1 will thereby—at all times—contain a vapor cloud 12c with optimal heat transfer capabilities, both from the inner surface 1a as well as onto the incoming substance 12.

Although particles in any created vapor cloud will necessarily be forced to the periphery of the treatment chamber by centrifugal forces, the continuous evaporation of liquids (such as water) will create strong internal forces in all internal directions, thereby securing a high percentage of vapor (steam) at the periphery.

Tests with the inventive separation apparatus has been performed while treating a waste substance containing 70% mineral solids, 15% water and 15% oil by weight (cuttings from drilling operations). The tests demonstrated a heat transfer rate between approx. 1000 W/m²K and 1200 W/m²K. Even higher heat transfer rates are expected for substances containing more water.

In the preceding description, various aspects of the method and the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiments, as well as other embodiments of the method and the apparatus, which are apparent to persons skilled in the art to which the disclosed subject matter pertains, are deemed to lie within the scope of the present invention.

The invention claimed is:

1. A method for thermal separation of a substance flowing into a treatment chamber by use of a separation apparatus, wherein the separation apparatus comprises:
   a vessel having vessel wall with an inner surface enclosing a treatment chamber of a length $l_c$, a height H and a width W, the vessel comprising at least one substance inlet and at least one first outlet and at least one second outlet for non-evaporable and evaporable parts, respectively,
   a heating device arranged outside the treatment chamber, and
   a rotary mechanism comprising a rotatable axle arranged within the treatment chamber directed along the treatment chamber's length $l_c$ and a mixing device of radial diameter $d_{md}$ and axial length $l_{md}$ fixed to the rotatable axle and extending perpendicular to the rotatable axle,
   wherein the method comprises:
   A. heating the inner surface by use of the heating device to transfer thermal energy to a minimum peripheral volume ($V_p$) of the treatment chamber confined between the mixing device and the inner surface,
   B. rotating the rotary mechanism by use of a rotary drive operably fixed to the rotatable axle to a peripheral rotation velocity ($v_p$) measured at a radial outer boundary of the mixing device's which exceeds a minimum peripheral rotation velocity ($v_{p,min}$) of 5 meters per second and equals to or is smaller than 40 meters per second,
   C. feeding the substance into the treatment chamber through the at least one substance inlet using a feeding device, wherein the substance comprises two or more components, where at least one of the components is evaporable at an evaporation temperature ($T_e$), and
   D. adjusting at least one of:
      an input power of the heating device,
      the flow of the substance fed into at least one of the at least one substance inlet,
      an input power of the rotary drive, and
      an output flow of a non-evaporated part of the substance released from the at least one first outlet,
   such that a total thermal energy transferred into at least part of the minimum peripheral volume ($V_p$) results in an operational temperature ($T_{op}$) that exceeds the evaporation temperature ($T_e$) during operation, and wherein the amount of thermal energy transferred into the part of the minimum peripheral volume ($V_p$) by the heating device constitutes more than 60% of the total thermal energy transferred,
   wherein the total transferred thermal energy, combined with rotation of the rotary mechanism, creates a vapor cloud comprising a mixture of the non-evaporable and evaporable parts, resulting in a near instantaneous heating and evaporation within the minimum peripheral volume ($V_p$),
   wherein an outermost radial part of the mixing device comprises a plurality of radially separated mixing protrusions, and
   wherein the peripheral rotation velocity ($v_p$) of the rotary mechanism is regulated such that an evaporated part of the substance present within the minimum peripheral volume ($V_p$) acquires a turbulent flow characteristic, the turbulent flow characteristic being detected by measuring a drop of a temperature difference $\Delta T$ between the vessel wall and the vapor cloud and/or a minimum of the temperature difference $\Delta T$.

2. The method according to claim 1, wherein the plurality of radially separated mixing protrusions is divided into one or more sets distributed axially along the rotatable axle, across the axial length ($l_{md}$) of the mixing device, the number of mixing protrusions in each set being defined as the number of mixing protrusions in a complete circle around the rotatable axle when seen along the direction of the rotatable axle, and wherein the minimum peripheral rotation velocity ($v_{p,min}$) of the rotary mechanism is further defined as $$v_{p,min} = C(d_{md}/\#_{mp}),$$

where
   C is a constant equal to, or higher than, $12\pi$,
   $\#_{mp}$ is the number of the radially separated mixing protrusions in each set and
   $d_{md}$ [m] is the radial diameter of the mixing device.

3. The method according to claim 1, wherein a ratio between the radial diameter ($d_{md}$) of the mixing device and a radial diameter ($d_c$) of the treatment chamber is between 0.8 and 1.0.

4. The method according to claim 1, wherein the plurality of radially separated mixing protrusions is divided into one or more sets distributed axially along the rotatable axle, across the axial length ($l_{md}$) of the mixing device, the number of mixing protrusions in each set being defined as the number of mixing protrusions in a complete circle around the rotatable axle when seen along the direction of the rotatable axle, and wherein the minimum peripheral rotation velocity ($v_{p,min}$) of the rotary mechanism is further defined as $$v_{p,min} = C(d_{md}/\#_{mp}),$$

where
   C is a constant equal to, or higher than, $45\pi$,
   $\#_{mp}$ is the number of the radially separated mixing protrusions in each set and
   $d_{md}$ [m] is the radial diameter of the mixing device.

5. The method according to claim 1, wherein the rotatable axle is arranged in alignment with a central axis ($C_{TC}$) of the treatment chamber.

6. The method according to claim 1, wherein the heating device is oriented in the direction of the length $l_c$ of the treatment chamber.

7. The method according to claim 1, wherein the heating device further comprises:
   an enclosure arranged around the vessel such that a void is created between an outer surface of the vessel wall and an inner surface of the enclosure, the enclosure comprising an enclosure inlet allowing feed of heating means into the void.

8. The method according to claim 1, wherein at least a part of an outer surface of the vessel wall is provided with a plurality of outer fins.

9. The method according to claim 1, wherein the heating device is arranged at least partly within the vessel wall.

10. The method according to claim 1, wherein, when the flow ($S_i$) is set at a constant rate, the input power to the heating device and the input power to the rotary drive are mutually adjusted such that the operational temperature ($T_{op}$) within at least part of the minimum peripheral volume ($V_p$) is achieved.

11. The method according to claim 1, wherein, when the input power to the rotary drive and the input power to the heating device are set at constant levels, the flow ($S_i$) is adjusted such that the operational temperature ($T_{op}$) within at least part of the minimum peripheral volume ($V_p$) is achieved.

12. The method according to claim 1,
wherein the separation apparatus further comprises:
a temperature sensor arranged such that a temperature within or at the treatment chamber may be monitored, and
a control system in signal communication with the temperature sensor, the feeding device, the rotary drive and the heating device, the control system being configured to automatically adjust at least one of the flow ($S_i$), the input power of the rotary drive and the input power of the heating device based on the temperature measured by the temperature sensor.

13. The method according to claim 1, wherein
the separation apparatus further comprises:
a temperature sensor arranged such that the temperature within or at the treatment chamber may be monitored, and
wherein the separation apparatus further comprises:
a control system in signal communication with the temperature sensor and the feeding device, the control system being configured to automatically adjust the flow ($S_i$) from the feeding device based on the temperature measured by the temperature sensor and
wherein step D involves:
measuring the temperature within or at the treatment chamber, transmitting the temperature to the control system which calculates a new flow ($S_n$) as function of the temperature, and
adjusting the flow ($S_i$) to the new flow ($S_n$) by transmitting a signal to the feeding device.

14. The method according to claim 1, wherein the mixing device comprises:
a plurality of rotary discs fixed with axial offsets to the rotatable axle, and
a plurality of axially oriented elongated objects interconnecting the plurality of rotary discs.

15. The method according to claim 14, wherein each of the plurality of rotary discs comprises at least one through-going opening for allowing the evaporated part to flow through during operation.

16. The method according to claim 1, wherein the mixing device comprises a plurality of radially protruding elements distributed with offsets along the length of the rotatable axle.

17. The method according to claim 16, wherein the mixing device comprises a plurality of rotary discs fixed with axial offsets to the rotatable axle and a plurality of axially oriented elongated objects interconnecting the plurality of rotary discs, wherein the plurality of radially protruding elements are replaceably connected to the plurality of axially oriented elongated objects.

18. The method according to claim 1, wherein the vessel is a cylinder having an inner axial length $l_c$ and an inner radial diameter $d_c$, wherein the ratio between the inner axial length $l_c$ and the inner radial diameter $d_c$ is equal or less than 4.0.

19. The method according to claim 1, wherein the total transferred thermal energy, combined with rotation of the rotary mechanism, creates a vapor cloud comprising a mixture of the non-evaporable and evaporable parts, resulting in a near instantaneous heating and evaporation within the minimum peripheral volume (Vp).

* * * * *